US012811677B2

(12) United States Patent
Igarashi et al.

(10) Patent No.: US 12,811,677 B2
(45) Date of Patent: Nov. 24, 2026

(54) CODE ERROR RATE ESTIMATION APPARATUS AND CODE ERROR RATE ESTIMATION METHOD

(71) Applicant: NTT, Inc., Tokyo (JP)

(72) Inventors: Ryo Igarashi, Musashino (JP); Junichi Kani, Musashino (JP); Kazutaka Hara, Musashino (JP); Ryo Koma, Musashino (JP)

(73) Assignee: NTT, Inc., Tokyo (JP)

( * ) Notice: Subject to any disclaimer, the term of this patent is extended or adjusted under 35 U.S.C. 154(b) by 158 days.

(21) Appl. No.: 18/865,434

(22) PCT Filed: Jun. 7, 2022

(86) PCT No.: PCT/JP2022/022940
§ 371 (c)(1),
(2) Date: Nov. 13, 2024

(87) PCT Pub. No.: WO2023/238228
PCT Pub. Date: Dec. 14, 2023

(65) Prior Publication Data
US 2025/0317200 A1 Oct. 9, 2025

(51) Int. Cl.
*H04B 10/07* (2013.01)
*H04B 10/073* (2013.01)
(Continued)

(52) U.S. Cl.
CPC ......... *H04B 10/073* (2013.01); *H04B 10/697* (2013.01); *H04B 10/07* (2013.01);
(Continued)

(58) Field of Classification Search
CPC .... H04B 10/073; H04B 10/697; H04B 10/07; H04B 10/0793; H04B 10/07953;
(Continued)

(56) References Cited

U.S. PATENT DOCUMENTS 6,275,959 B1 * 8/2001 Ransijn ................. H04L 25/061 714/705
6,822,214 B2 * 11/2004 Han ..................... H04B 10/697 250/214 R (Continued)

OTHER PUBLICATIONS

Hiroki Kawahara et al., Optical Full-mesh Network Technologies Supporting the All-Photonics Network, NTT Technical Review vol. 18, No. 5, May 2020, pp. 24-29.

(Continued)

*Primary Examiner* — Dibson J Sanchez
(74) *Attorney, Agent, or Firm* — Harness, Dickey & Pierce, P.L.C.

(57) ABSTRACT

A code error rate estimation device included in an optical transmission system using a direct detection receiver, the code error rate estimation device including: a transmission path model creation unit that creates a physical model of a transmission path for each candidate path for performing communication between user devices that perform communication; a propagation waveform calculation unit that generates an electric field signal waveform to be output from a transmitter assumed in the physical model of the transmission path and generates a reception signal waveform at the time of direct detection by using linear fiber propagation simulation; a nonlinear noise calculation unit that calculates nonlinear noise light intensity of light on the basis of the physical model of the transmission path; a noise intensity conversion unit that converts the calculated nonlinear noise light intensity of the light into noise in an electrical stage; a reception signal waveform calculation unit that calculates a Gaussian distribution of each symbol or each sample in a reception signal waveform at the time of the direct direction on the basis of the reception signal waveform at the time of the direct detection and the converted noise in the electrical stage; and a code error rate calculation unit that calculates a (Continued)

code error rate on the basis of the Gaussian distribution of each symbol or each sample.

8 Claims, 12 Drawing Sheets

(51) Int. Cl.
*H04B 10/69* (2013.01)
*H04B 10/079* (2013.01)
*H04J 14/02* (2006.01)

(52) U.S. Cl.
CPC .... *H04B 10/0793* (2013.01); *H04B 10/07953* (2013.01); *H04J 14/0227* (2013.01); *H04J 14/0267* (2013.01); *H04J 14/0271* (2013.01)

(58) Field of Classification Search
CPC .. H04B 10/00; H04J 14/0227; H04J 14/0267; H04J 14/0271
USPC .......................................... 398/9–38, 43–103
See application file for complete search history.

(56) References Cited

U.S. PATENT DOCUMENTS

| | | | | |
|---|---|---|---|---|
| 7,092,435 | B2 * | 8/2006 | Saruwatari | H04B 10/07953 375/317 |
| 7,190,902 | B2 * | 3/2007 | Solheim | H04J 14/0227 398/16 |
| 7,212,741 | B2 * | 5/2007 | Myong | H04B 10/69 398/25 |
| 7,283,741 | B2 * | 10/2007 | Sadananda | H04L 45/02 398/5 |
| 10,686,546 | B2 * | 6/2020 | Tanzi | H04J 14/0271 |
| 2002/0051271 | A1 * | 5/2002 | Yoshikoshi | H04B 10/695 398/202 |
| 2005/0175340 | A1 * | 8/2005 | Penninckx | H04L 45/00 398/7 |
| 2008/0152358 | A1 * | 6/2008 | Uto | H04B 10/695 398/1 |
| 2009/0162075 | A1 * | 6/2009 | Naito | H04L 45/00 398/182 |
| 2011/0206371 | A1 * | 8/2011 | Tajima | H04J 14/0271 398/29 |
| 2011/0292949 | A1 * | 12/2011 | Hayashi | H04L 45/00 370/419 |
| 2012/0148234 | A1 * | 6/2012 | Bellagamba | H04J 14/0227 398/28 |
| 2013/0142508 | A1 * | 6/2013 | Bottari | H04B 10/27 398/25 |
| 2013/0294782 | A1 * | 11/2013 | Liboiron-Ladouceur | H03M 13/458 398/202 |
| 2014/0133849 | A1 * | 5/2014 | Ishii | H04B 10/0793 398/26 |
| 2014/0328587 | A1 * | 11/2014 | Magri | H04J 14/0257 398/34 |
| 2014/0334815 | A1 * | 11/2014 | Grellier | H04J 14/0227 398/79 |
| 2014/0334817 | A1 * | 11/2014 | Miedema | H04J 14/0267 398/48 |
| 2016/0110237 | A1 * | 4/2016 | Poulo | G06F 11/076 714/704 |
| 2016/0191194 | A1 * | 6/2016 | Wood | H04B 10/27 398/58 |
| 2016/0316283 | A1 * | 10/2016 | Kim | H04J 14/0271 |
| 2017/0134089 | A1 * | 5/2017 | Mansouri Rad | H04J 14/0271 |
| 2017/0310395 | A1 * | 10/2017 | Mehrvar | H04J 14/0257 |
| 2018/0145747 | A1 * | 5/2018 | Oda | H04J 14/02219 |
| 2019/0215073 | A1 * | 7/2019 | Schmogrow | H04B 10/0793 |
| 2021/0135756 | A1 * | 5/2021 | Procaccioli | H04B 10/25891 |
| 2022/0360334 | A1 * | 11/2022 | Schubert | H04L 45/121 |

OTHER PUBLICATIONS

Martin Birk et al., The OpenROADM initiative [Invited], Journal of Optical Communications and Networking, vol. 12, No. 6, Jun. 2020, pp. C58-C67.

Martin Bouda et al., Accurate Prediction of Quality of Transmission with Dynamically Configurable Optical Impairment Model, Th1J.4, OFC2017, 2017.

Wolfgang Freude et al., Quality Metrics for Optical Signals: Eye Diagram, Q-factor, OSNR, EVM and BER, Mo.B1.5, ICTON2012, 2012.

Alessio Ferrari et al., GNPy: an open source application for physical layer aware open optical networks, Journal of Optical Communications and Networking, vol. 12, No. 6, Jun. 2020, pp. C31-C40.

Pierluigi Poggiolini et al., A Detailed Analytical Derivation of the GN Model of Non-Linear Interference in Coherent Optical Transmission Systems, Sep. 2012.

Pierluigi Poggiolini, The GN Model of Non-Linear Propagation in Uncompensated Coherent Optical Systems, Journal of Lightwave Technology, vol. 30, No. 24, Dec. 15, 2012, pp. 3857-3879.

N. A. Olsson, Lightwave Systems With Optical Amplifiers, Journal of Lightwave Technology. vol.7, No. 7, Jul. 1989, pp. 1071-1082.

Takashi Ono et al., Demonstration of high-dispersion tolerance of 20-Gbit/s optical duobinary signal generated by a low-pass filtering method, Proceedings of Optical Fiber Communication Conference, 1997.

* cited by examiner

CODE ERROR RATE ESTIMATION APPARATUS AND CODE ERROR RATE ESTIMATION METHOD

CROSS-REFERENCE TO RELATED APPLICATIONS

This application is a 371 U.S. National Phase of International Application No. PCT/JP2022/022940, filed on Jun. 7, 2022. The entire disclosure of the above application is incorporated herein by reference.

TECHNICAL FIELD

The present invention relates to a code error rate estimation device and a code error rate estimation method.

BACKGROUND ART

In the related art, a configuration of an optical communication network in which each node disposed in the network is configured by an optical switch and user terminals are connected without photoelectric conversion by dynamically allocating optimal wavelengths and paths in accordance with connection requests of the user terminals has been proposed (see Non Patent Literature 1 to 3, for example).

FIG. 11 is a diagram illustrating a configuration example of an optical communication network system in the related art. In the optical communication network system in the related art illustrated in FIG. 11, a configuration in which a plurality of nodes 200-1 to 200-5 constitute a mesh network and a user terminal 300-1 and a user terminal 300-2 are connected is illustrated. The plurality of nodes 200-1 to 200-5 are optical switches. Optical fibers are used to establish connection between the user terminal 300 and the node 200 and among the plurality of nodes 200.

Here, a case where the user terminal 300-1 is newly connected to the optical communication network system and there has been a connection request to the user terminal 300-2 will be considered. At this time, a first path or a second path, for example, is conceivable as a path that connects the user terminal 300-1 and the user terminal 300-2. The first path is a path directed to the user terminal 300-2 via the nodes 200-1, 200-2, and 200-3 when seen from the user terminal 300-1. The second path is a path directed to the user terminal 300-2 via the nodes 200-1, 200-4, and 200-3 when seen from the user terminal 300-1.

In general, fiber loss increases as the transmission distance increases in optical fiber transmission. Therefore, a code error rate increases due to the optical signal intensity at the time of a fiber output decreasing. The code error rate is also degraded by influences of wavelength dispersion generated in the process of fiber propagation and waveform distortion due to a nonlinear optical effect. Additionally, communication cannot be performed through a path in which the code error rate exceeds a prescribed value.

In order to determine a path to be allocated between the user terminal 300-1 and the user terminal 300-2, it is necessary to measure a value of a code error rate for each of candidate paths and to select a path through which communication can be made from among the candidate paths on the basis of the measurement results. However, actually causing a signal to flow through each path and measuring the code error rate are not practical since they lead to an increase in path allocation time. Thus, a method of estimating the code error rate when a signal is caused to flow through each path has been studied.

According to Non Patent Literature 4, it is well known that a code error rate can be calculated on the basis of probability densities of a mark and a space in a case where there is no waveform degradation in a reception signal. Symbols of the mark and the space including noise are represented by a Gaussian distribution g(x) indicated by Expression (1) below.

[Math. 1]

$$g(x) = \frac{1}{\sqrt{2\pi\sigma^2}} \exp\left(-\frac{(x-\mu)^2}{2\sigma^2}\right) \quad \text{Expression (1)}$$

Furthermore, dispersion 62 in the Gaussian distribution g(x) is represented by Expression (2) below.

[Math. 2]

$$\sigma^2 = \sigma_{th}^2 + \sigma_{sig-ASE}^2 + \sigma_{shot}^2 \quad \text{Expression (2)}$$

In Expression (2), $\sigma_{th}^2$ represents thermal noise, $\sigma_{sig\text{-}ASE}^2$ represents signal-amplified spontaneous emission (ASE) beat noise, and $\sigma_{shot}^2$ represents shot noise. Note that the thermal noise $\sigma_{th}^2$ is represented by Expression (3) below, the signal-ASE beat noise $\sigma_{sig\text{-}ASE}^2$ is represented by Expression (4) below, and the shot noise $\sigma_{shot}^2$ is represented by Expression (5) below.

[Math. 3]

$$\sigma_{th}^2 = \frac{4kT\Delta f}{R} \quad \text{Expression (3)}$$

[Math. 4]

$$\sigma_{sig-ASE}^2 = 4\left(\frac{e\eta}{h\nu}\right)^2 P_0 P_{ASE} \quad \text{Expression (4)}$$

[Math. 5]

$$\sigma_{shot}^2 = 2eI\Delta f = \frac{2e^2\eta P_0\Delta f}{h\nu} \quad \text{Expression (5)}$$

In Expression (3), R represents an electrical resistance of a photodiode, K represents the Boltzmann constant, T represents an absolute temperature, and Δf represents a reception band of the receiver. In Expression (4), h represents Planck's constant, v represents a frequency of light, e represents the amount of charge of electrons, η represents quantum efficiency in the photodiode, $P_0$ represents light intensity, and $P_{ASE}$ represents a reception ASE intensity included in the band Δf. I in Expression (5) represents a current.

A probability density function in a case where there is no waveform degradation in a reception signal is illustrated in FIG. 12. The code error rate can be calculated on the basis of Expression (6) below.

[Math. 6]

$$\text{Code error rate} = \frac{\text{(Integral of probability density of space of not less than threshold value + Integral of probability density of mark of not more than threshold value)}}{\text{(Integral of probability density over entire mark region + Integral of probabilty density over entire space)}} \quad \text{Expression (6)}$$

A code error rate estimation method based on a probability density is effective in a case where waveform degradation due to propagation is small. On the other hand, the code error rate estimation method based on a probability density cannot be applied to long-distance fiber propagation since symbol intensity changes due to wavelength dispersion and waveform degradation due to a nonlinear optical effect. As a method taking influences of such waveform degradation at the time of propagation into consideration, utilization of optical fiber transmission simulation, for example, is conceivable. In general, a change in waveform due to optical fiber transmission is described by a nonlinear Schrödinger equation. It is possible to accurately calculate a change in waveform after propagation due to a linear effect such as wavelength dispersion or a nonlinear optical effect by applying an algorithm called a split step Fourier method to the nonlinear Schrödinger equation.

In the split step Fourier method, an optical fiber is split into short sections, and propagation in the fiber is simulated by repeating calculation in a time domain and a frequency domain for each section. However, since it is necessary to minutely section the fiber sections in order to secure high calculation accuracy, and the calculation time becomes enormous, there is a problem that it is not possible to estimate a code error rate in real time.

Thus, a method using a Gaussian noise model has been proposed as a code error rate estimation method taking influences of the nonlinear optical effect into consideration while reducing the calculation time (see Non Patent Literature 5 to 7, for example). In the method using the Gaussian noise model, the code error rate is calculated by regarding waveform distortion due to the nonlinear optical effect as random noise ONLY of the Gaussian distribution such as thermal noise, shot noise, or signal-ASE beat noise.

According to the scheme, it is possible to calculate influences of the nonlinear optical effect in a short period of time, but it is not possible to take linear waveform degradation such as wavelength dispersion into account. Thus, an application to a digital coherent transmission scheme according to which it is possible to compensate for wavelength degradation due to wavelength dispersion is assumed at present. On the other hand, since it is not possible to completely compensate for a linear waveform change such as wavelength dispersion by the intensity modulation-direct detection (IM-DD) scheme which is a less expensive communication scheme, it is not possible to apply the method using the Gaussian noise model as it is.

CITATION LIST

Non Patent Literature

Non Patent Literature 1: Hiroki Kawahara et al., "Optical Full-mesh Network Technologies Supporting the All-Photonics Network", NTT Technical Review, vol. 18, no. 5, pp. 24-29, May 2020.

Non Patent Literature 2: M. Birk et al., "The OpenROADM initiative [Invited]", J. Opt. Commun. Netw., vol. 12, no. 6, pp. C58-67, June 2020.

Non Patent Literature 3: M. Bouda et al., "Accurate Prediction of Quality of Transmission with Dynamically Configurable Optical Impairment Model", Th1J.4, OFC2017.

Non Patent Literature 4: W. Freude et al., "Quality Metrics for Optical Signals: Eye Diagram, Q-factor, OSNR, EVM and BER", Mo.B1.5, ICTON 2012.

Non Patent Literature 5: A. Ferrari et al., "GNPy: an open source application for physical layer aware open optical networks", J. Opt. Commun. Netw., vol. 12, no. 6, pp. C31-C40, June 2020.

Non Patent Literature 6: P. Poggiolini et al., "A Detailed Analytical Derivation of the GN Model of Non-Linear Interference in Coherent Optical Transmission Systems".

Non Patent Literature 7: P. Poggiolini et al., "The GN Model of Non-Linear Propagation in Uncompensated Coherent Optical Systems", J. Lightw. Technol., vol. 30, no. 24, pp. 3857-3879 December 2012.

SUMMARY OF INVENTION

Technical Problem

As described above, the optical transmission system in the related art using the direct detection receiver has a problem that it is not possible to estimate a code error rate with high accuracy and in a short period of time in consideration of both the nonlinear optical effect and the linear waveform change.

In view of the above circumstances, an object of the present invention is to provide a technology that enables estimation of a code error rate with high accuracy and in a short period of time in an optical transmission system using direct detection receiver.

Solution to Problem

An aspect of the present invention is a code error rate estimation device included in an optical transmission system using a direct detection receiver, the code error rate estimation device including: a transmission path model creation unit that creates a physical model of a transmission path for each candidate path for performing communication between user devices that perform communication; a propagation waveform calculation unit that generates an electric field signal waveform to be output from a transmitter assumed in the physical model of the transmission path created by the transmission path model creation unit and generates a reception signal waveform at the time of direct detection by using linear fiber propagation simulation; a nonlinear noise calculation unit that calculates nonlinear noise light intensity of light on the basis of the physical model of the transmission path created by the transmission path model creation unit; a noise intensity conversion unit that converts the nonlinear noise light intensity of the light calculated by the nonlinear noise calculation unit into noise in an electrical stage; a reception signal waveform calculation unit that calculates a Gaussian distribution of each symbol or each sample in a reception signal waveform at the time of the direct direction on the basis of the reception signal waveform at the time of the direct detection obtained by the propagation waveform calculation unit and the noise in the electrical stage converted by the noise intensity conversion unit; and a code error rate calculation unit that calculates a code error rate on the basis of the Gaussian distribution of each symbol or each sample calculated by the reception signal waveform calculation unit.

An aspect of the present invention is a code error rate estimation method performed by a code error rate estimation device included in an optical transmission system using a direct detection receiver, the code error rate estimation method including: creating a physical model of a transmission path for each candidate path for performing communication between user devices that perform communication; generating an electric field signal waveform to be output from a transmitter assumed in the created physical model of the transmission path and generating a reception signal waveform at the time of direct detection by using linear fiber propagation simulation; calculating nonlinear noise light intensity of light on the basis of the created physical model of the transmission path; converting the calculated nonlinear noise light intensity of the light into noise in an electrical stage; calculating a Gaussian distribution of each symbol or each sample in a reception signal waveform at the time of the direct direction on the basis of the obtained reception signal waveform at the time of the direct detection and the converted noise in the electrical stage; and calculating a code error rate on the basis of the Gaussian distribution of each symbol or each sample.

Advantageous Effects of Invention

According to the present invention, it is possible to estimate a code error rate with high accuracy and in a short period of time in an optical transmission system using a direct detection receiver.

DESCRIPTION OF EMBODIMENTS

Hereinafter, an embodiment of the present invention will be described with reference to the drawings.

Figure 1:
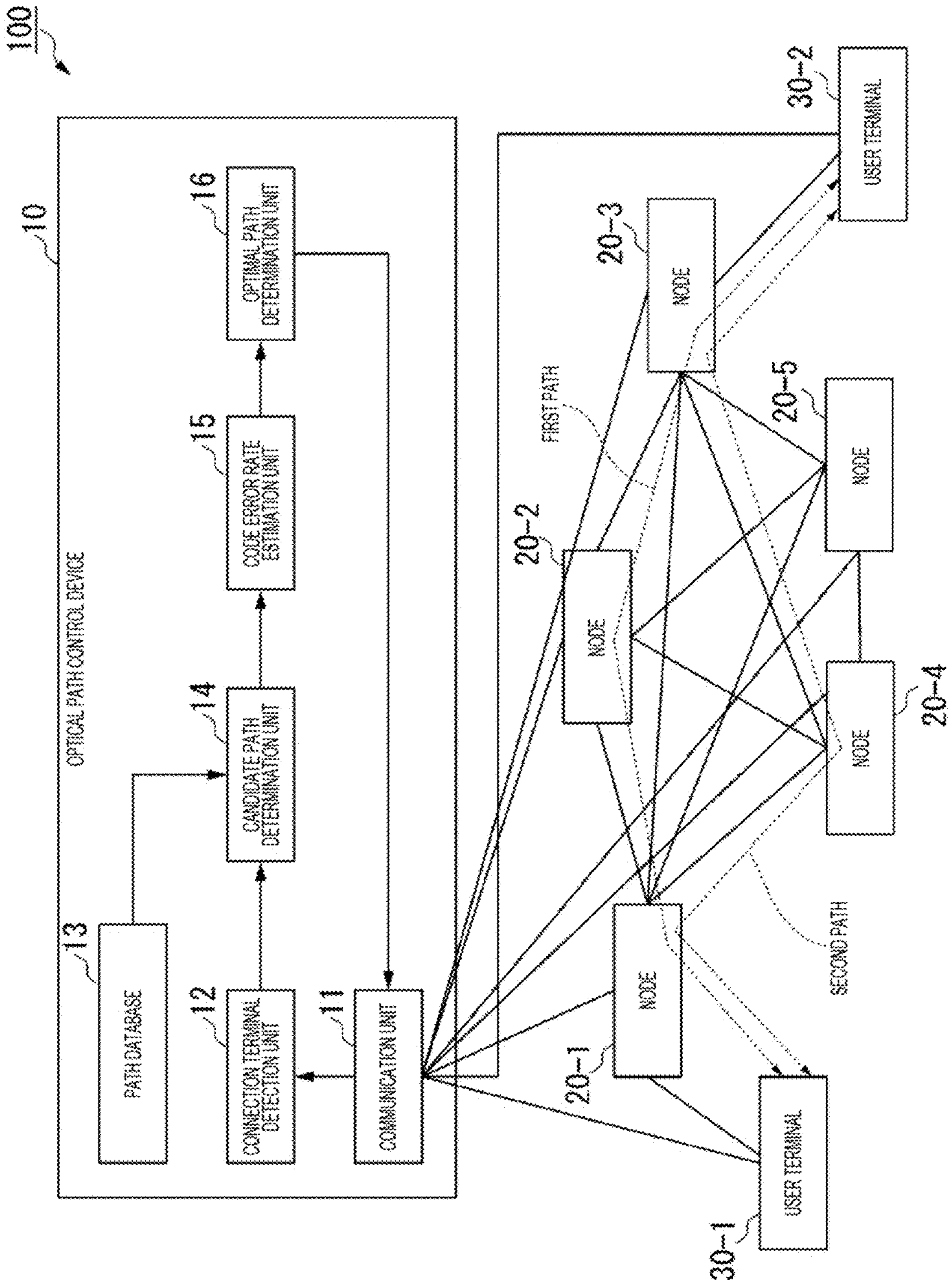
FIG. 1 A diagram illustrating a configuration example of an optical transmission system in the present invention.

FIG. 1 is a diagram illustrating a configuration example of an optical transmission system 100 in the present invention. The optical transmission system 100 includes an optical path control device 10 and a plurality of nodes 20. FIG. 1 illustrates five nodes 20-1 to 20-5 as the plurality of nodes 20. Note that the number of nodes 20 is an example and it is only necessary to include a plurality of nodes 20. A user terminal 30-1 is connected to the node 20-1, and a user terminal 30-2 is connected to the node 20-3. The following description will be given by exemplifying a case where the user terminals 30-1 and 30-2 included in the optical transmission system 100 in the present invention perform communication by using the IM-DD scheme. Note that the optical transmission system 100 in the present invention can be applied to a system that performs direct detection and the modulation scheme is not limited to direct modulation and may be another scheme. Note that one or more optical amplifiers may be included in paths between the nodes 20 and between the nodes 20 and the user terminals 30.

The optical path control device 10 determines paths that are candidates for performing communication between the user terminals 30 (hereinafter, referred to as "candidate paths") and estimates a code error rate for each of the determined candidate paths. The optical path control device 10 determines an optimal path for performing communication between the user terminals 30 on the basis of the estimated code error rate for each candidate path. The optical path control device 10 controls the nodes 20 and sets a path such that communication can be performed through the determined optimal path.

In the example illustrated in FIG. 1, a first path and a second path are illustrated as candidate paths. The first path is a path directed to the user terminal 30-2 via the nodes 20-1, 20-2, and 20-3 when seen from the user terminal 30-1. The second path is a path directed to the user terminal 30-2 via the nodes 20-1, 20-4, and 20-3 when seen from the user terminal 30-1. The optical path control device 10 determines an optimal path on the basis of a result of estimating a code error rate for each of the first path and the second path, for example.

The nodes 20 switch a path to be connected in accordance with control of the optical path control device 10 and communicatively connect the user terminal 30-1 and the user terminal 30-2. The nodes 20 are, for example, optical switches.

The user terminals 30 are terminals that are operated by users who use the optical transmission system 100. The user terminal transmits, to the optical path control device 10, user information (user authentication information, user position information (information indicating which of the nodes 20 and which of optical fibers the user terminals 30 are connected to), a modulation scheme, a modulation speed (baud rate), and the like) at the time of connection to the optical transmission system 100. The user terminals 30 include transmitters that perform predetermined modulation (intensity modulation, for example) and receivers that perform direct detection.

Next, a configuration of the optical path control device 10 will be described. The optical path control device 10 includes a communication unit 11, a connection terminal detection unit 12, a path database 13, a candidate path determination unit 14, a code error rate estimation unit 15, and an optimal path determination unit 16.

The communication unit 11 performs communication with the nodes 20 and the user terminals 30. For example, the communication unit 11 receives user information from the user terminals 30. For example, the communication unit 11 transmits information regarding the path determined by the optimal path determination unit 16 to each node 20. The communication unit 11 can thus control a connection relationship of each node 20.

The connection terminal detection unit 12 identifies the user terminals 30 connected to the optical transmission system 100 on the basis of the user information received by the communication unit 11. Here, identifying the user terminals 30 means detecting that the user terminals 30 have been connected to the optical transmission system 100 and performing user authentication. Hereinafter, the user terminals 30 for which user authentication has been performed will also be described as identified user terminals 30.

The path database 13 registers information (position information of each node 20 and a state of each node, for example) of the nodes 20 constituting the entire network.

The candidate path determination unit 14 determines candidate paths on the basis of the information regarding the nodes 20 registered in the path database 13 and the user information regarding the user terminals 30 identified by the connection terminal detection unit 12.

The code error rate estimation unit 15 estimates a code error rate for each candidate path calculated by the candidate path determination unit 14. Specifically, the code error rate estimation unit 15 estimates a code error rate assumed to be obtained in a case where a signal is caused to pass through each candidate path. In other words, the code error rate estimation unit 15 estimates the code error rate of each candidate path without actually causing a signal to flow through each candidate path. Hereinafter, the processing in which the code error rate estimation unit 15 estimates the code error rate will be described as code error estimation processing.

The optimal path determination unit 16 determines an optimal path on the basis of the code error rate of each candidate path estimated by the code error rate estimation unit 15. Specifically, the optimal path determination unit 16 selects candidate paths with code error rates less than a prescribed value first. Then, the optimal path determination unit 16 determines an optimal path on the basis of a network design policy held in advance from among the selected candidate paths.

Next, an outline of a method of estimating a code error rate with high accuracy and in a short period of time in the optical transmission system 100 will be described. The processing is performed by the code error rate estimation unit 15. The code error rate estimation unit 15 separates influences of linear distortion from influences of nonlinear distortion occurring at the time of fiber transmission, independently calculates the influences of the linear distortion and the influences of the nonlinear distortion, then combines the influences, and thereby estimates the code error rate in a short period of time while taking both into consideration.

Specifically, the code error rate estimation unit 15 generates an electric field signal waveform for an arbitrary modulation scheme and calculates a reception signal waveform at the time of direct detection in a short period of time through fiber propagation simulation taking linear distortion into consideration (based on a linear term in the nonlinear Schrödinger equation, for example). On the other hand, on the assumption that the nonlinear distortion causes random noise in the receiver, the code error rate estimation unit 15 calculates nonlinear noise power of light on the basis of the methods described in Non Patent Literature 5 to 7, converts the nonlinear noise power of the light into an electrical stage, and thereby calculates a random probability density distribution.

The code error rate estimation unit 15 adds noise containing a nonlinear distortion component to the reception waveform after the direct detection after the linear propagation simulation. Here, two methods are exemplified as methods of adding the noise containing the nonlinear distortion component.

A first noise addition method is a method of summing up the probability density function for each reception symbol after the linear propagation simulation.

A second noise addition method is a method of adding a random error in accordance with the aforementioned noise distribution to the reception waveform after the linear propagation simulation.

The code error rate estimation unit 15 can calculate the code error rate in a short period of time while taking both linear and nonlinear influences into consideration by performing the aforementioned processing. A specific configuration for realizing the aforementioned processing will be described below in detail.

First Embodiment

In a first embodiment, a configuration in which noise containing a nonlinear distortion component is added to a reception waveform after direct detection after linear propagation simulation by the first noise addition method will be described.

Figure 2:
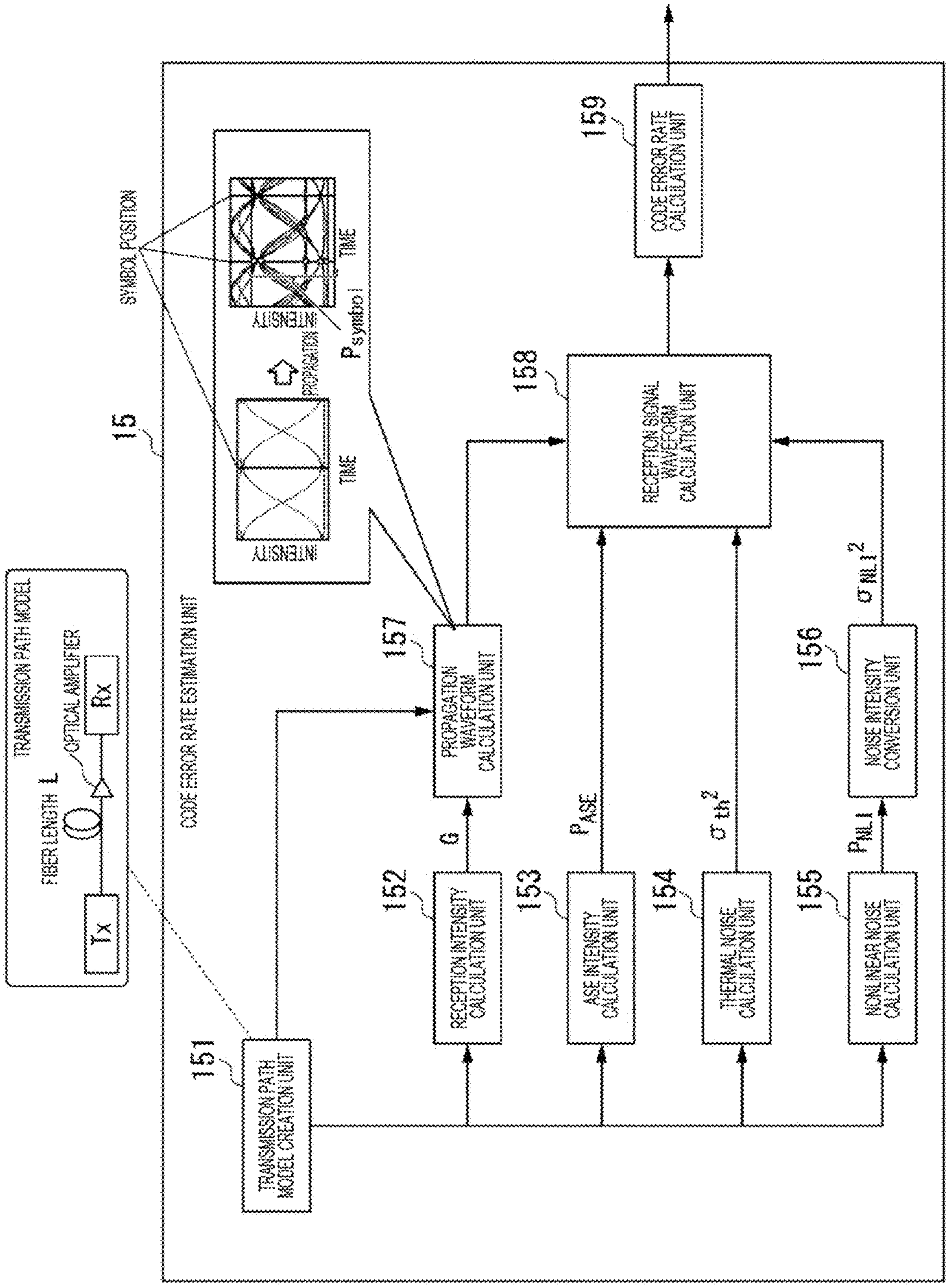
FIG. 2 A diagram illustrating a configuration example of a code error rate estimation unit in a first embodiment.

FIG. 2 is a diagram illustrating a configuration example of the code error rate estimation unit 15 according to the first embodiment. The code error rate estimation unit 15 includes a transmission path model creation unit (transmission path model creator) 151, a reception intensity calculation unit 152, an ASE intensity calculation unit 153, a thermal noise calculation unit 154, a nonlinear noise calculation unit (nonlinear noise calculator) 155, a noise intensity conversion unit (noise intensity convertor) 156, a propagation waveform calculation unit (propagation waveform calculator) 157, a reception signal waveform calculation unit (reception signal waveform calculator) 158, and a code error rate calculation unit (code error rate calculator) 159.

The transmission path model creation unit 151 creates a physical model of a transmission path (hereinafter, referred to as a "transmission path model") between the user terminals 30 for each candidate path. The transmission path model includes, for example, the type of an optical fiber used for the transmission path, the length of the fiber (fiber length), the type and the position of an optical amplifier, presence/absence of a signal of another existing user. In the following description, a transmission path model in a case where an optical amplifier for compensating for loss is inserted after propagation through the optical fiber with a fiber length L will be considered.

The reception intensity calculation unit 152 calculates reception light intensity at least on the basis of fiber loss and an optical amplifier gain with reference to the transmission path model created by the transmission path model creation unit 151. The reception intensity calculation unit 152 outputs a gain coefficient G corresponding to the calculated reception light intensity to the propagation waveform calculation unit 157.

The ASE intensity calculation unit 153 calculates intensity $P_{ASE}$ of ASE input to the receiver that is assumed in the transmission path model created by the transmission path model creation unit 151.

The thermal noise calculation unit 154 calculates thermal noise $\sigma_{th}^2$ on the basis of characteristics of the receiver assumed in the transmission path model created by the transmission path model creation unit 151.

The nonlinear noise calculation unit 155 calculates nonlinear noise light intensity $P_{NLI}$ of the light on the basis of the transmission path model created by the transmission path model creation unit 151. The nonlinear noise light intensity $P_{NLI}$ of the light is calculated on the basis of the methods described in Non Patent Literature 5 to 7, for example.

The noise intensity conversion unit 156 converts the nonlinear noise light intensity $P_{NLI}$ of the light calculated by the nonlinear noise calculation unit 155 into a noise in an electrical stage. In this manner, the noise intensity conversion unit 156 acquires nonlinear noise $\sigma_{NLI}^2$. The nonlinear noise $\sigma_{NLI}^2$ is noise containing a nonlinear distortion component.

The propagation waveform calculation unit 157 generates an electrical field signal waveform output from a transmitter assumed in the transmission model created by the transmission path model creation unit 151 and calculates a waveform after propagation through the fiber with the length L on the basis of the Schrödinger equation. At this time, only the linear effects (such as wavelength dispersion) are taken into consideration in regard to the fiber propagation, and it is possible to calculate the waveform after the transmission in a short period of time. In this manner, the propagation waveform calculation unit 157 generates an electric field signal waveform for the arbitrary modulation scheme and calculates the reception signal waveform at the time of direct detection in a short period of time through linear fiber propagation simulation taking linear distortion into consideration (based on the linear term in the nonlinear Schrödinger equation). In this manner, the propagation waveform calculation unit 157 generates a signal electric field waveform after the fiber propagation.

Note that the propagation waveform calculation unit 157 causes signal intensity to coincide with the reception light intensity obtained by the reception intensity calculation unit 152 by multiplying the electric field signal waveform output from the transmitter assumed in the transmission path model by the coefficient G calculated by the reception intensity calculation unit 152.

The reception signal waveform calculation unit 158 calculates a probability density of intensity $P_{symbol}$ of each symbol on the basis of information regarding the intensity $P_{symbol}$ of each symbol in the signal electric field waveform after the fiber propagation, the intensity $P_{ASE}$ of the ASE calculated by the ASE intensity calculation unit 153, the thermal noise $\sigma_{th}^2$ calculated by the thermal noise calculation unit 154, and the nonlinear noise ONLY converted by the noise intensity conversion unit 156.

The reception symbol obtained by the receiver is considered to be distributed as a Gaussian distribution g(x) with the intensity $P_{symbol}$ of each symbol included at the center ($\mu = P_{symbol}$). Here, if nonlinear noise is assumed to be Gaussian noise and dispersion thereof is assumed to be $\sigma_{NLI}$, dispersion $\sigma^2$ of the Gaussian distribution containing other noise components can be represented by Expression (7) below.

[Math. 7]

$$\sigma^2 = \sigma_{th}^2 + \sigma_{sig-ASE}^2 + \sigma_{shot}^2 + \sigma_{NLI}^2 \qquad \text{Expression (7)}$$

In Expression (7), short noise $\sigma_{shot}$ is calculated on the basis of the intensity $P_{symbol}$ of each symbol, and signal-ASE beat noise $\sigma_{sig-ASE}^2$ is calculated on the basis of the intensity $P_{symbol}$ of each symbol and the intensity $P_{ASE}$ of the ASE.

The reception signal waveform calculation unit 158 splits the reception symbol into a mark and a space and calculates a Gaussian distribution $g_i(x)$ with the symbol intensity included at the center for every one symbol. The Gaussian distribution $g_i(x)$ is a distribution for an i-th symbol. The reception signal waveform calculation unit 158 calculates a probability density of each of the mark and the space by adding the Gaussian distribution calculated for each symbol. In this manner, the reception signal waveform calculation unit 158 calculates the probability distribution of the entire reception symbol sequence by summing up the probability density function for each reception symbol after the linear propagation simulation.

The code error rate calculation unit 159 calculates the code error rate on the basis of threshold value determination for the probability densities of the mark and the space calculated by the reception signal waveform calculation unit 158. For example, the code error rate calculation unit 159 estimates the code error rate on the basis of the probability distribution of the entire reception symbol sequence.

Next, a method of deriving the nonlinear noise $\sigma_{NLI}^2$ acquired by the noise intensity conversion unit 156 will be specifically described. The nonlinear noise light intensity $P_{NLI}$ of the light derived in Non Patent Literature 5 to 7 is noise in the light domain that is similar to the ASE. It is thus necessary to obtain the nonlinear noise ONLY in the electrical stage. In Non Patent Literature 5 to 7, coherent reception by which signal-ASE beat noise is canceled out is assumed, and a signal-to-noise ratio (SNR) in the light stage is thus equal to the SNR in the electrical stage in that case. Therefore, it is possible to know characteristics of the receiver if the amount of noise of the light is known. On the other hand, a case where light and electrical SNRs are different is conceivable in a direct detection system in which signal-ASE beat noise is not canceled out. Therefore, it is necessary to perform conversion from light to electricity. Thus, it is not possible to apply the existing scheme to the direct detection system as in the present invention.

The nonlinear noise light intensity $P_{NLI}$ of the light is noise of the light similarly to the ASE and can thus be considered similarly to influences of ASE power on reception characteristics. Here, a relationship between an optical signal-to-noise ratio (OSNR) which is an SNR of light and the SNR of electricity of the ASE will be described. According to Reference Literature 1, signal-ASE beat noise $\sigma_{sig-ASE}^2$ in a case where an optical signal with intensity $P_{in}$ is caused to be incident on an optical amplifier with a gain $G_{amp}$ and a receiver is placed in the later stage of the optical amplifier is represented by Expression (8) below.

(Reference Literature 1: N. A. OLSSON, "Lightwave Systems With Optical Amplifiers", JOURNAL OF LIGHTWAVE TECHNOLOGY. VOL. 7. NO. 7. July 1989, p. 1071-1082)

[Math. 8]

$$\sigma_{sig-ASE}^2 = \frac{4GIinI_{ASEBe}}{B_0} = 2GIinI_{ASE} \quad \text{Expression (8)}$$

Here, quantum efficiency of a photodiode (PD) is assumed to be η=1, 2Be (electric band)=$B_0$ (light band) for simplicity. On the assumption that the quantum efficiency n of the PD as 1, the signal intensity $P_{sig}$ and the signal current $I_{sig}$ satisfy $I_{sig}=(P_{sig}e)/(hv)$, $I_{ASE}=(P_{ASE}e)/(hv)$, and Expression (8) can be expressed as Expression (9) on the assumption that the intensity of the signal that is incident on the receiver satisfies $P_{sig}=G \times P_{in}$.

[Math. 9]

$$\sigma_{sig-ASE}^2 = 2P_{sig}P_{ASE}\left(\frac{e}{hv}\right)^2 \quad \text{Expression (9)}$$

$SNR_{ASE}$ in a case where only the ASE is taken into consideration from Expression (9) is represented by Expression (10) below.

[Math. 10]

$$SNR_{ASE} = \frac{I_{sig}^2}{\sigma_{sig-ASE}^2} = \frac{P_{sig}^2\left(\frac{e}{hv}\right)^2}{2P_{sig}P_{ASE}\left(\frac{e}{hv}\right)^2} = \frac{P_{sig}}{2P_{ASE}} = \frac{1}{2}OSNR \quad \text{Expression (10)}$$

As represented by Expression (10), it is possible to know that $SNR_{ASE}$ is ½ the OSNR (see Reference Literature 2).

(Reference Literature 2: Wolfgang Freude et al., "Quality Metrics for Optical Signals: Eye Diagram, Q-factor, OSNR, EVM and BER", ICTON 2012)

Here, optical signal-noise ratio in a case where only the nonlinear noise light intensity $P_{NLI}$ of the light is regarded as noise of the light is assumed to be ONSR', and Expression (11) is obtained on the basis of $P_{sig}=I_{sig}$ (hv/e).

[Math. 11]

$$SNR_{NLI} = \frac{I_{sig}^2}{\sigma_{NLI}^2} = \frac{1}{2}OSNR' = \frac{P_{sig}}{2P_{NLI}} = \frac{P_{sig}P_{sig}\left(\frac{e}{hv}\right)^2}{2P_{NLI}P_{sig}\left(\frac{e}{hv}\right)^2} = \frac{I_{sig}^2}{2P_{NLI}I_{sig}\left(\frac{hv}{e}\right)\left(\frac{e}{hv}\right)^2} = \frac{I_{sig}^2}{2P_{NLI}I_{sig}\left(\frac{e}{hv}\right)} = \frac{I_{sig}^2}{\sigma_{NLI}^2} \quad \text{Expression (11)}$$

From Expression (11), the nonlinear noise $\sigma_{NLI}^2$ in the electrical stage can be derived as Expression (12) below.

[Math. 12]

$$\sigma_{NLI}^2 = 2P_{NLI}I_{sig}\left(\frac{e}{hv}\right) \quad \text{Expression (12)}$$

Figure 3:
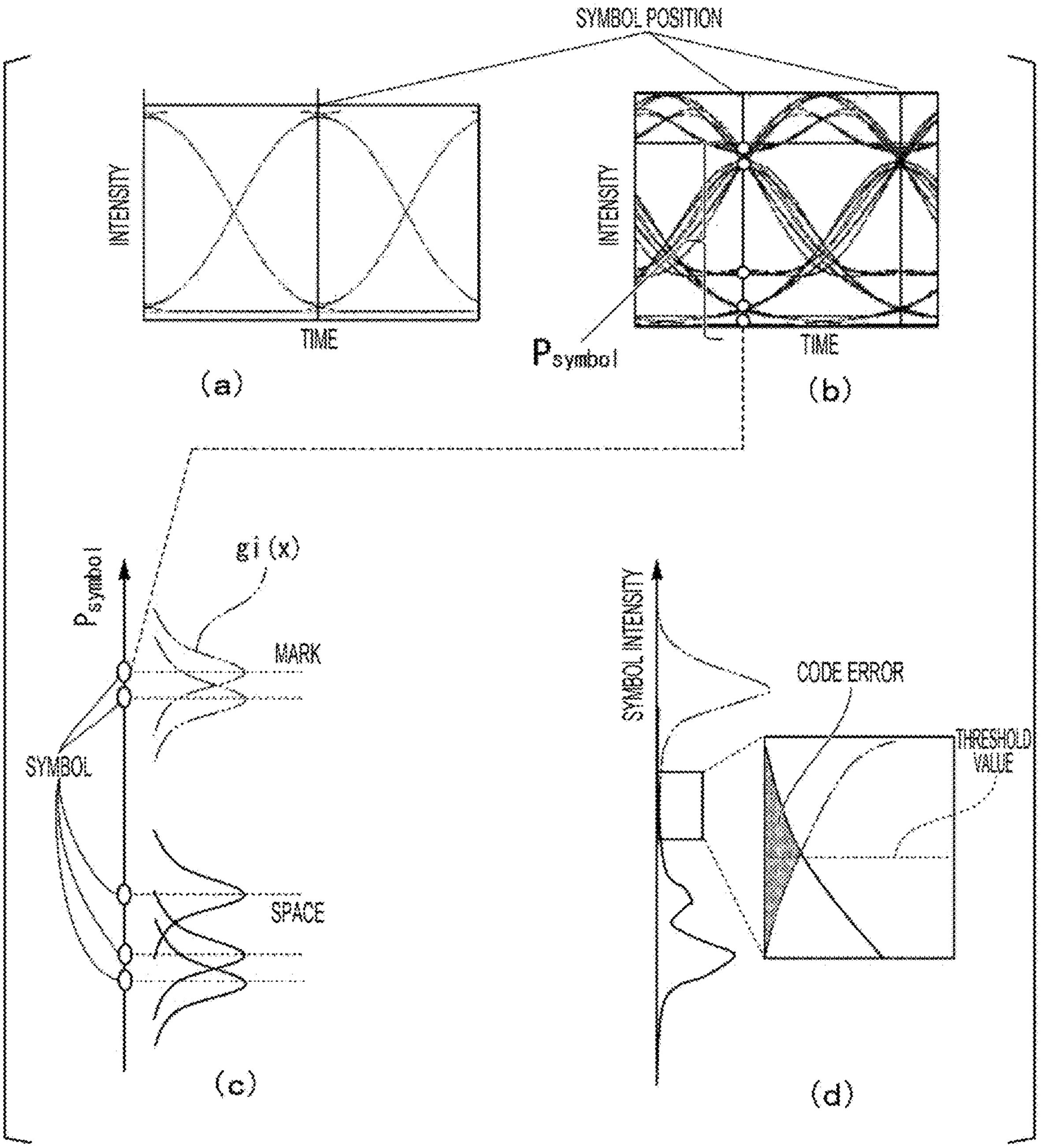
FIG. 3 A diagram for explaining specific processing of a reception signal waveform calculation unit and a code error rate calculation unit in the first embodiment.

FIG. 3 is a diagram for explaining specific processing of the reception signal waveform calculation unit 158 and the code error rate calculation unit 159 in the first embodiment. (a) illustrated in FIG. 3 illustrates an electric field signal waveform before fiber propagation, (b) illustrates a signal electric field waveform after the fiber propagation, (c) illustrates the Gaussian distribution $g_i(x)$ of each symbol calculated by the reception signal waveform calculation unit 158, and (d) illustrates a result of adding the Gaussian distribution $g_i(x)$ of each symbol.

As illustrated in (b) of FIG. 3, five symbols are present in the signal electric field waveform after the fiber propagation. Therefore, the reception signal waveform calculation unit 158 calculates the Gaussian distribution $g_i(x)$ (here, i=1 to 5) with the symbol intensity of each of the five symbols included at the center (see (c) of FIG. 3). The code error rate calculation unit 159 calculates the code error rate on the basis of threshold value determination for the probability density.

Figure 4:
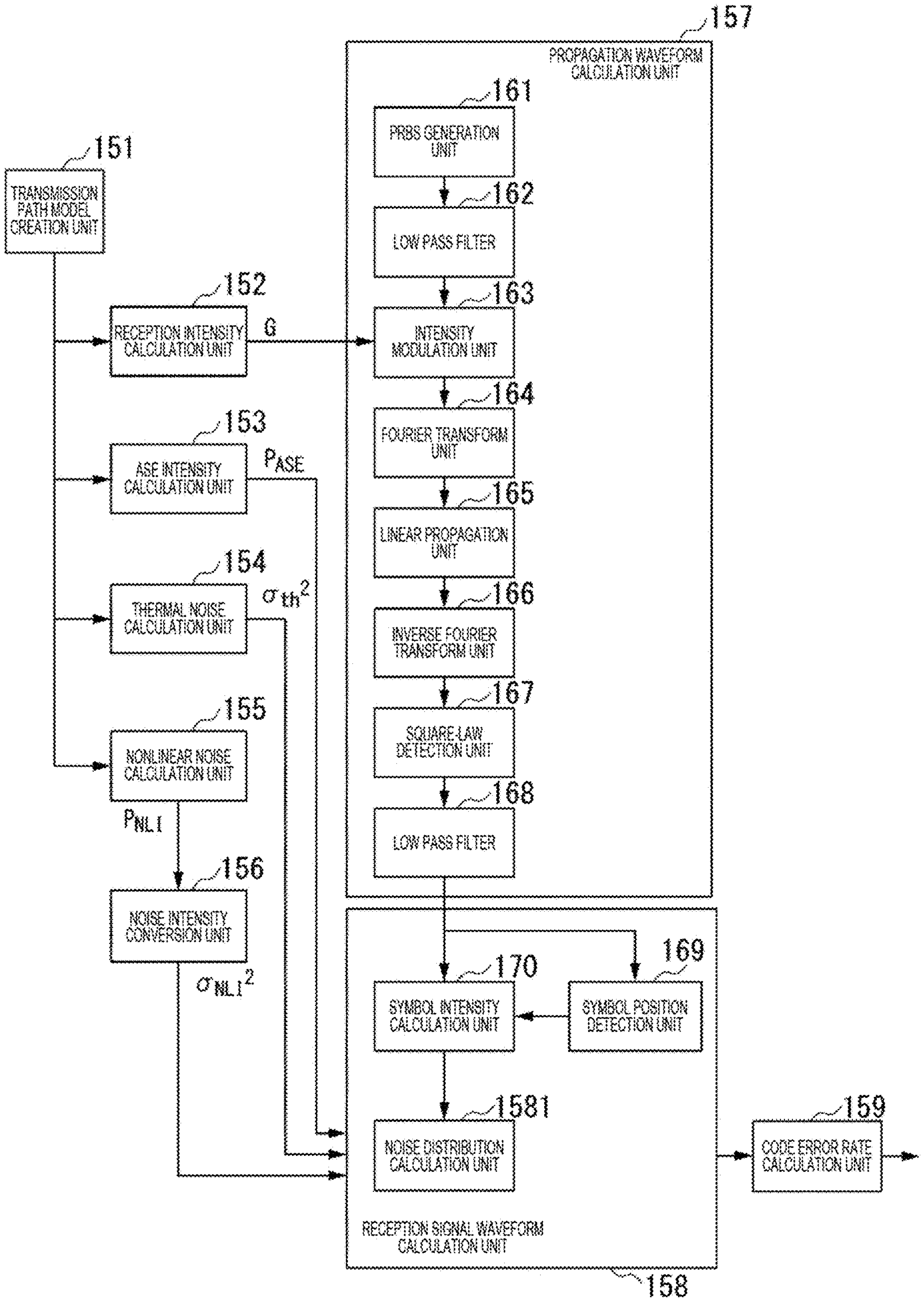
FIG. 4 A diagram illustrating configuration examples of a propagation waveform calculation unit and a reception signal waveform calculation unit in the first embodiment.

FIG. 4 is a diagram illustrating configuration examples of the propagation waveform calculation unit 157 and the reception signal waveform calculation unit 158 in the first embodiment. Note that FIG. 4 also illustrates functional units other than the propagation waveform calculation unit 157 and the reception signal waveform calculation unit 158 in order to illustrate relationships with the other functional units. The propagation waveform calculation unit 157 includes a pseudo random bit sequence (PRBS) generation unit 161, a low pass filter 162, an intensity modulation unit 163, a Fourier transform unit 164, a linear propagation unit 165, an inverse Fourier transform unit 166, a square-law detection unit 167, and a low pass filter 168.

The PRBS generation unit 161 causes PRBS signals to be generated. In other words, the PRBS generation unit 161 generates PRBS signals.

The low pass filter 162 filters the PRBS signals generated by the PRBS generation unit 161. The low pass filter 162 attenuates and blocks signals with higher frequencies than a specific threshold value and allows signals with frequencies that are equal to or less than the specific threshold value to pass therethrough, from among the PRBS signals. In this manner, the low pass filter 162 generates a modulation signal $E_m(t)$ by applying a band limitation of the transmitter. Note that a non-return-to-zero (NRZ) signal is assumed here. The same applies to the following description.

The intensity modulation unit 163 generates an optical electric field waveform E(t) modulated with the modulation signal $E_m(t)$ generated by the low pass filter 162. Specifically, the intensity modulation unit 163 generates a complex electric field E(t) having a carrier frequency $f_0$ and an amplitude of $G \cdot E_0(t)$. Here, G represents a net gain calculated on the basis of loss of the optical fiber, the gain of the optical amplifier, a transmitter output, and the like. The value of G is set such that an average of $(G \cdot E_0(t))^2$ becomes the reception light intensity calculated by the reception intensity calculation unit 152. The complex electric field E(t) generated by the intensity modulation unit 163 is represented by Expression (13) below.

[Math. 13]

$$E(t) = G \cdot E_0(t)\exp j(2\pi f_0 t) \qquad \text{Expression (13)}$$

The Fourier transform unit 164 converts the complex electric field E(t) generated by the intensity modulation unit 163 into a frequency domain (E(f)) by performing Fourier transform. The frequency domain (E(f)) converted by the Fourier transform unit 164 is represented by Expression (14) below.

[Math. 14]

$$E(f) = F.T.[E(t)] \qquad \text{Expression (14)}$$

The linear propagation unit 165 multiples a phase change amount $\exp j(2\pi^2\beta_2 Lf^2)$ by the frequency domain (E(f)). In this manner, the linear propagation unit 165 calculates an electric field waveform (EL(f)) after the fiber propagation of the distance L. This method is a linear component transmission simulation method derived by solving the linear term of the nonlinear Schrödinger equation. The electric field waveform ($E_L$(f)) after the fiber propagation derived by the linear propagation unit 165 is represented by Expression (15) below.

[Math. 15]

$$E_L(f) = E(f)\exp j\left(2\pi^2\beta_2 Lf^2\right) \qquad \text{Expression (15)}$$

The inverse Fourier transform unit 166 obtains the electric field waveform ($E_L$(t)) after the fiber propagation of the length L by returning the electric field waveform ($E_L$(f)) after the fiber propagation derived by the linear propagation unit 165 to the time domain again by performing inverse Fourier transform. The electric field waveform ($E_L$(t)) after the fiber propagation converted by the inverse Fourier transform unit 166 is represented by Expression (16) below.

[Math. 16]

$$E_L(t) = I.F.T.\,[E_L(f)] \qquad \text{Expression (16)}$$

The square-law detection unit 167 calculates light intensity I obtained after PD reception from the square of the electric field waveform ($E_L$(t)). The light intensity I(t) calculated by the square-law detection unit 167 is represented by Expression (16) below. Note that asterisk in Expression (17) represents a complex conjugate.

[Math. 17]

$$I(t) = E_L(t) \cdot E_L*(t) \qquad \text{Expression (17)}$$

The low pass filter 168 filters signals representing the light intensity I(t) calculated by the square-law detection unit 167. The low pass filter 168 attenuates and blocks signals with higher frequencies than a specific threshold value and allows signals with frequencies that are equal to or less than the specific threshold value, from among the signals representing the light intensity I(t). In this manner, the low pass filter 168 applies a band limitation of the receiver. It is thus possible to obtain a signal form after the fiber propagation as illustrated in (b) of FIG. 3, for example.

The reception signal waveform calculation unit 158 includes a symbol position detection unit 169, a symbol intensity calculation unit 170, and a noise distribution calculation unit 1581.

The symbol position detection unit 169 detects the symbol position in the signal waveform after the fiber propagation obtained by the propagation waveform calculation unit 157.

The symbol intensity calculation unit 170 calculates intensity $P_{symbol}$ of each symbol on the basis of the signal waveform after the fiber propagation obtained by the propagation waveform calculation unit 157 and the symbol position detected by the symbol position detection unit 169.

The noise distribution calculation unit 1581 calculates a probability density of the intensity $P_{symbol}$ of each symbol on the basis of information regarding the intensity $P_{symbol}$ of each symbol calculated by the symbol intensity calculation unit 170, the intensity $P_{ASE}$ of the ASE calculated by the ASE intensity calculation unit 153, the thermal noise $\sigma_{th}^2$ calculated by the thermal noise calculation unit 154, and the nonlinear noise $\sigma_{NLI}^2$ converted by the noise intensity conversion unit 156. Furthermore, the noise distribution calculation unit 1581 calculates the probability distribution of the entire reception symbol sequence by summing up the probability density function for each reception symbol after the linear propagation simulation.

Figure 5:
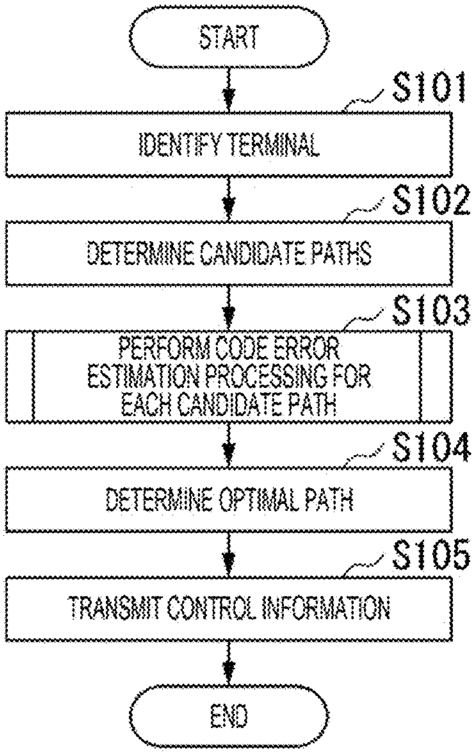
FIG. 5 A flowchart illustrating a flow of path determination processing performed by an optical path control device in the first embodiment.

FIG. 5 is a flowchart illustrating a flow of path determination processing performed by the optical path control device 10 in the first embodiment. Note that a case where the connection terminal detection unit 12 of the optical path control device 10 has detected connection requests from the user terminal 30-1 and the user terminal 30-2 will be described in FIG. 5. In other words, the description will be given on the assumption that the communication unit 11 has received user information from each of the user terminal 30-1 and the user terminal 30-2.

The connection terminal detection unit 12 identifies each user terminal 30 on the basis of the user information of the user terminal 30-1 and the user information of the user terminal 30-2 received by the communication unit 11 (step S101). The connection terminal detection unit 12 outputs the user information of the identified user terminals 30 to the candidate path determination unit 14.

The candidate path determination unit 14 determines candidate paths on the basis of the path database 13 and the user information of the identified user terminals 30 output from the connection terminal detection unit 12 (step S102). The candidate path determination unit 14 outputs information regarding each determined candidate path to the code error rate estimation unit 15.

Here, the information regarding each candidate path output by the candidate path determination unit 14 includes which of the nodes 20 is to be connected to the user terminal 30-1 or 30-2 and which of the nodes 20 is to be passed, for each candidate path. In a case where the candidate paths are the first path and the second path illustrated in FIG. 1, for example, information indicating that the user terminal 30-1 is connected to the node 20-1, the user terminal 30-2 is connected to the node 20-3, and the nodes 20-1, 20-2, and 20-3 are to be passed is included for the first path. For the second path, information indicating that the user terminal 30-1 is connected to the node 20-1, the user terminal 30-2 is connected to the node 20-3, and the nodes 20-1, 20-4, and 20-3 are to be passed is included.

Figure 6:
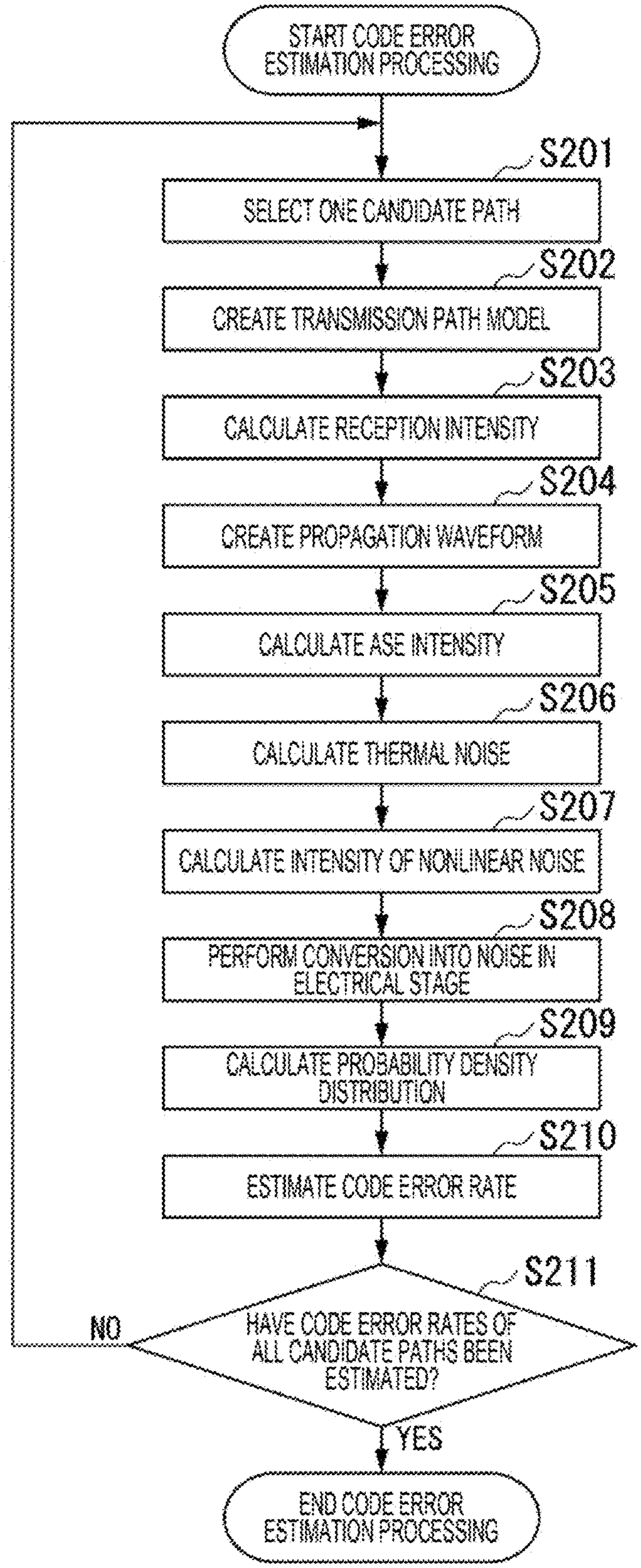
FIG. 6 A flowchart illustrating a flow of code error estimation processing performed by the optical path control device in the first embodiment.

The code error rate estimation unit 15 performs code error rate estimation processing on each candidate path on the basis of the information regarding each candidate path output from the candidate path determination unit 14 (step S103). Specific processing of the code error estimation processing will be described later (FIG. 6). The code error rate estimation unit 15 outputs a result of the code error estimation processing for each candidate path to the optimal path determination unit 16. The optimal path determination unit 16 determines an optimal path as a path through which the user terminal 30-1 and the user terminal 30-2 are to perform communication, on the basis of the result of the code error rate estimation processing for each candidate path output from the code error rate estimation unit 15 (step S104).

The optimal path determination unit 16 generates control information for controlling each node 20 included in the optimal path in order to cause communication to be established through the optimal path, on the basis of the determined optimal path. The control information includes switching information for forming a path in which a connection relationship of the nodes 20 that are optical switches is optimal. The optimal path determination unit 16 controls the communication unit 11 and causes the communication unit 11 to transmit the generated control information to the target nodes 20. The communication unit 11 transmits the control information to the target nodes 20 in accordance with the control of the optimal path determination unit 16 (step S105). In this manner, the nodes 20 that have received the control information switch the connection relationship in accordance with the control information.

In a case where the optimal path determination unit 16 determines the first path as an optimal path, for example, the optimal path determination unit 16 generates switching information that the path is to be switched to connect the user terminal 30-1 and the node 20-2, as the control information for the node 20-1. Furthermore, the optimal path determination unit 16 generates switching information that the path is to be switched to connect the node 20-1 and the node 20-3, as the control information for the node 20-2. Moreover, the optimal path determination unit 16 generates switching information that the path is to be switched to connect the node 20-2 and the user terminal 30-2, as the control information for the node 20-3.

FIG. 6 is a flowchart illustrating a flow of code error estimation processing performed by the optical path control device 10 in the first embodiment.

The transmission path model creation unit 151 selects one candidate path from among the candidate paths indicated by the information related to each candidate path output from the candidate path determination unit 14 (step S201). For example, the transmission path model creation unit 151 selects a candidate path that has not been selected from among the candidate paths output from the candidate path determination unit 14. The transmission path model creation unit 151 creates a transmission path model related to the selected candidate path (step S202).

The transmission path model creation unit 151 outputs information regarding the created transmission path model to the reception intensity calculation unit 152, the ASE intensity calculation unit 153, the thermal noise calculation unit 154, and the nonlinear noise calculation unit 155. The reception intensity calculation unit 152 calculates reception light intensity on the basis of the transmission path model created by the transmission path model creation unit 151 (step S203). The reception intensity calculation unit 152 outputs a gain coefficient G corresponding to the calculated reception light intensity to the propagation waveform calculation unit 157.

The propagation waveform calculation unit 157 creates a signal electric field waveform after fiber propagation on the basis of the transmission path model created by the transmission path model creation unit 151 (step S204). Note that the propagation waveform calculation unit 157 causes signal intensity to coincide with the reception light intensity obtained by the reception intensity calculation unit 152 by multiplying the electric field signal waveform output from the transmitter assumed in the transmission path model by the coefficient G calculated by the reception intensity calculation unit 152. Thereafter, the propagation waveform calculation unit 157 creates the signal electric field waveform after the fiber propagation through processing of the Fourier transform unit 164, the linear propagation unit 165, the inverse Fourier transform unit 166, the square-law detection unit 167, and the low pass filter 168.

The propagation waveform calculation unit 157 outputs information regarding the created signal electric field waveform after the fiber propagation to the reception signal waveform calculation unit 158. The symbol position detection unit 169 of the reception signal waveform calculation unit 158 detects the position of the symbol in the signal electric field waveform after the fiber propagation. The symbol position detection unit 169 outputs information regarding the detected symbol position to the symbol intensity calculation unit 170. The symbol intensity calculation unit 170 of the reception signal waveform calculation unit 158 calculates the intensity $P_{symbol}$ of each symbol specified by the information regarding the symbol position output from the symbol position detection unit 169. The propagation waveform calculation unit 157 outputs information regarding the intensity $P_{symbol}$ of each symbol to the noise distribution calculation unit 1581. The ASE intensity calculation unit 153 calculates the intensity $P_{ASE}$ of the ASE input to the receiver assumed in the transmission path model created by the transmission path model creation unit 151 (step S205). The ASE intensity calculation unit 153 outputs information regarding the calculated intensity $P_{ASE}$ of the ASE to the reception signal waveform calculation unit 158.

The thermal noise calculation unit 154 calculates thermal noise $\sigma_{th}^2$ on the basis of characteristics of the receiver assumed in the transmission path model created by the transmission path model creation unit 151 (step S206). The thermal noise calculation unit 154 outputs information regarding the calculated thermal noise $\sigma_{th}^2$ to the reception signal waveform calculation unit 158. The nonlinear noise calculation unit 155 calculates nonlinear noise light intensity $P_{NLI}$ of the light on the basis of the transmission path model created by the transmission path model creation unit 151 (step S207). The nonlinear noise calculation unit 155 outputs information regarding the calculated nonlinear noise light intensity $P_{NLI}$ of the light to the noise intensity conversion unit 156.

The noise intensity conversion unit 156 converts the nonlinear noise light intensity $P_{NLI}$ of the light calculated by the nonlinear noise calculation unit 155 into nonlinear noise ONLY in the electrical stage (step S208). The noise intensity conversion unit 156 outputs information regarding the nonlinear noise ONLY in the electrical stage to the reception signal waveform calculation unit 158. The noise distribution calculation unit 1581 of the reception signal waveform calculation unit 158 calculates the probability density of the intensity $P_{symbol}$ of each symbol on the basis of the information regarding the intensity $P_{symbol}$ of each symbol output from the symbol intensity calculation unit 170, the information regarding the intensity $P_{ASE}$ of the ASE calculated by the ASE intensity calculation unit 153, the information regarding the thermal noise $\sigma_{th}^2$ calculated by the thermal noise calculation unit 154, and the information regarding the nonlinear noise $\sigma_{NLI}^2$ converted by the noise intensity conversion unit 156 (step S209). The reception signal waveform calculation unit 158 calculates a probability density of each of the mark and the space by adding the Gaussian distribution calculated for each symbol. The reception signal waveform calculation unit 158 outputs information regarding the probability density of each of the mark and the space to the code error rate calculation unit 159.

The code error rate calculation unit 159 calculates a code error rate on the basis of threshold value determination for the probability densities of the mark and the space calculated by the reception signal waveform calculation unit 158 (step S210). The code error rate calculation unit 159 regards the calculated code error rate as a result of estimating the code error rate of the candidate path selected in the processing in step S201. The code error rate calculation unit 159 outputs the estimation result (the code error rate of the selected candidate path) along with the information regarding the candidate path to the optimal path determination unit 16. The transmission path model creation unit 151 determines whether or not code error rates have been estimated for all the candidate paths (step S211).

The transmission path model creation unit 151 may determine that the code error rates of all the candidate paths have been estimated in a case where all the candidate paths indicated by the information regarding each candidate path output from the candidate path determination unit 14 have been selected. On the other hand, the transmission path model creation unit 151 may determine that the code error rates of all the candidate paths have not been estimated in a case where any of the candidate paths indicated by the information regarding each candidate path output from the candidate path determination unit 14 has not been selected.

In a case where the transmission path model creation unit 151 determines that the code error rates of all the candidate paths have been estimated (step S211—YES), the code error rate estimation unit 15 ends the code error estimation processing. In a case where the transmission path model creation unit 151 determines that the code error rates of all the candidate paths have not been estimated (step S211—NO), the transmission path model creation unit 151 selects the candidate paths that have not been selected in the processing in step S201.

Note that the configuration in which the code error rate calculation unit 159 outputs the estimation result to the optimal path determination unit 16 every time the code error rate of one candidate path is calculated has been described in the aforementioned example. The code error rate calculation unit 159 may output the estimation results of all the candidate paths to the optimal path determination unit 16 after calculating the code error rates of all the candidate paths.

According to the optical path control device 10 configured as described above, the transmission path model creation unit 151 that creates a transmission path model for each candidate path, the propagation waveform calculation unit 157 that generates an electric field signal waveform output from a transmitter assumed in the transmission path model and generates a reception signal waveform at the time of direct detection through linear fiber propagation simulation, the nonlinear noise calculation unit 155 that calculates nonlinear noise light intensity of the light on the basis of the transmission path model, the noise intensity conversion unit 156 that converts the nonlinear noise light intensity of the light into noise in the electrical stage, the reception signal waveform calculation unit 158 that calculates a Gaussian distribution of each symbol in the reception signal waveform at the time of direct detection on the basis of the reception signal waveform at the time of the direct detection and the noise in the electrical stage and calculates a sum of the calculated Gaussian distribution of each symbol, and the code error rate calculation unit 159 that calculates a code error rate on the basis of the sum of the Gaussian distribution of each symbol are included. In this manner, the optical path control device 10 separates the influences of the linear distortion generated at the time of fiber transmission from the influences of the nonlinear distortion, independently calculates the influences of the linear distortion and the influences of the nonlinear distortion, then combines the influences, and thereby estimates the code error rate in a short period of time while taking both into consideration. Therefore, it is possible to calculate the code error rate in a short period of time while taking both linear and nonlinear influences into consideration.

Second Embodiment

In the first embodiment, the configuration in which the reception symbol is split into the mark and the space and the code error rate is calculated on the basis of the probability density of each of the mark and the space has been described. On the other hand, a method of improving wavelength dispersion resistance at the time of IM-DD long-distance transmission by waveform equalization processing of a reception digital signal processor (DSP) has been proposed in recent years. In a second embodiment, a configuration in which a code error rate is estimated when waveform equalization processing by the reception DSP is performed will be described. In the second embodiment, noise containing a nonlinear distortion component is added to a reception waveform after direct detection after linear propagation simulation by the second noise addition method. Note that a configuration of a code error rate estimation unit in the second embodiment is different from that in the first embodiment.

Figure 7:
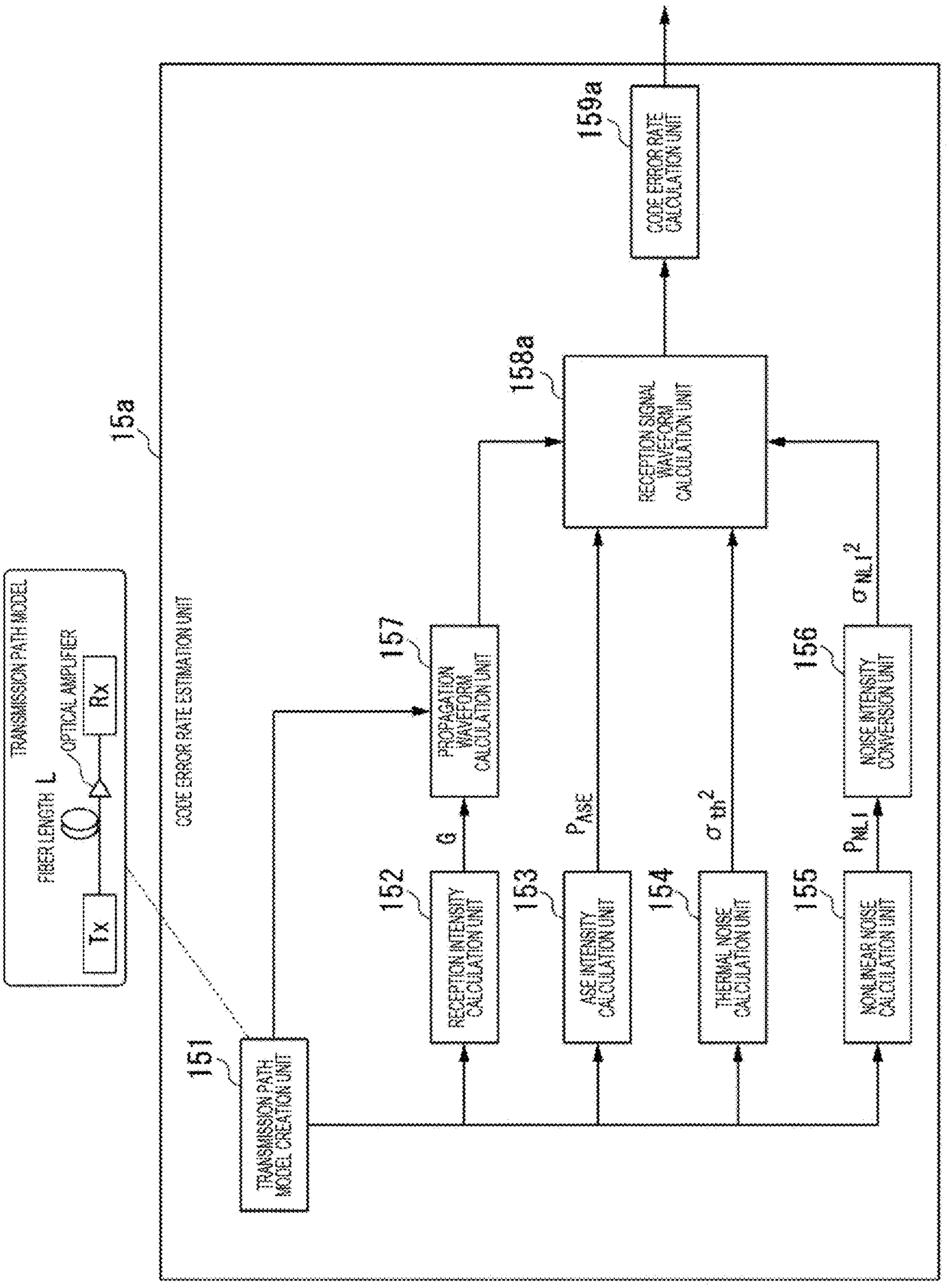
FIG. 7 A diagram illustrating a configuration example of a code error rate estimation unit in a second embodiment.

FIG. 7 is a diagram illustrating a configuration example of a code error rate estimation unit 15*a* in the second embodiment. The code error rate estimation unit 15*a* includes a transmission path model creation unit 151, a reception intensity calculation unit 152, an ASE intensity calculation unit 153, a thermal noise calculation unit 154, a nonlinear noise calculation unit 155, a noise intensity conversion unit 156, a propagation waveform calculation unit 157, a reception signal waveform calculation unit 158*a*, and a code error rate calculation unit 159*a*.

The code error rate estimation unit 15*a* has a different configuration from that of the code error rate estimation unit 15 in that the code error rate estimation unit 15*a* includes the reception signal waveform calculation unit 158*a* and the code error rate calculation unit 159*a* instead of the reception signal waveform calculation unit 158 and the code error rate calculation unit 159. The other configurations of the code error rate estimation unit 15*a* are similar to those of the code error rate estimation unit 15. Hereinafter, the reception signal waveform calculation unit 158*a* and the code error rate calculation unit 159*a* will be described.

The reception signal waveform calculation unit 158*a* adds random noise in accordance with the Gaussian distribution of each reception signal to a signal electric field waveform after fiber propagation. Thereafter, the reception signal waveform calculation unit 158*a* decodes a reception code sequence by performing DSP processing (for example, adaptive equalization processing such as finite impulse response (FIR) filter) and threshold value determination at a symbol position on the signal with the noise added thereto.

The code error rate calculation unit 159*a* calculates a code error rate on the basis of the reception code sequence decoded by the reception signal waveform calculation unit 158*a*. For example, the code error rate calculation unit 159*a* estimates the code error rate by comparing a transmission code sequence with the reception code sequence decoded by the reception signal waveform calculation unit 158*a*.

Figure 8:
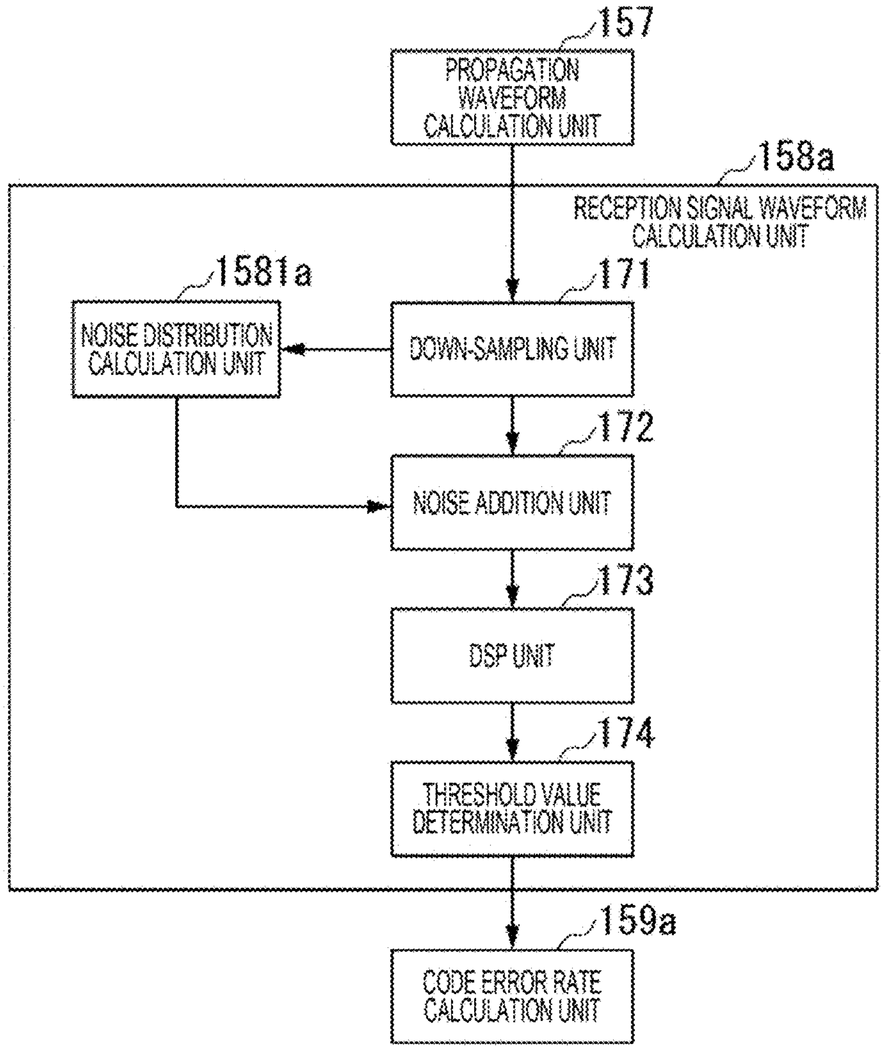
FIG. 8 A diagram illustrating a configuration example of a reception signal waveform calculation unit in the second embodiment.

FIG. 8 is a diagram illustrating a configuration example of the reception signal waveform calculation unit 158*a* in the second embodiment. Note that FIG. 8 also illustrates functional units other than the reception signal waveform calculation unit 158*a* in order to illustrate relationships with the other functional units. The reception signal waveform calculation unit 158*a* includes a noise distribution calculation unit (noise distribution calculator) 1581*a*, a down-sampling unit 171, a noise addition unit (noise adder) 172, a DSP unit (digital signal processor) 173, and a threshold value determination unit (threshold value determiner) 174.

The configuration of the reception signal waveform calculation unit 158*a* is different from that of the reception signal waveform calculation unit 158 in that the reception signal waveform calculation unit 158*a* includes the noise distribution calculation unit 1581*a* instead of the noise distribution calculation unit 1581, does not include the symbol position detection unit 169 and the symbol intensity calculation unit 170, and includes the down-sampling unit 171, the noise addition unit 172, the DSP unit 173, and the threshold value determination unit 174. Hereinafter, the noise distribution calculation unit 1581*a*, the down-sampling unit 171, the noise addition unit 172, the DSP unit 173, and the threshold value determination unit 174 will be described.

The down-sampling unit 171 down-samples a signal waveform after the fiber propagation obtained by the propagation waveform calculation unit 157 to a sampling rate in accordance with the DSP unit 173.

The noise distribution calculation unit 1581*a* calculates intensity of each sample on the basis of the signal waveform after the fiber propagation down-sampled by the down-sampling unit 171, intensity $P_{ASE}$ of ASE calculated by the ASE intensity calculation unit 153, thermal noise $\sigma_{th}^2$ calculated by the thermal noise calculation unit 154, and nonlinear noise ONLY converted by the noise intensity conversion unit 156. Then, the noise distribution calculation unit 1581*a* calculates a Gaussian distribution with the calculated intensity of each sample included at the center. In this manner, the noise distribution calculation unit 1581*a* calculates the Gaussian distribution for each sample.

The noise addition unit 172 adds up the random noise in accordance with the Gaussian distribution of each sample obtained by the noise distribution calculation unit 1581*a* to the signal waveform after the propagation down-sampled by the down-sampling unit 171. The noise addition unit 172 outputs the signal waveform after the propagation down-sampled with the noise added thereto to the DSP unit 173.

In a case where the noise added by the noise addition unit 172 is white noise, the noise components are added in a wide band from a low frequency band to a high frequency band. On the other hand, in a case of a demodulation configuration in which band limitation by a digital filter is performed in the DSP unit 173 in the later stage, high-frequency noise components are removed. Therefore, there is a likelihood that noise intensity observed at and after the DSP unit 173 is lower than the actual noise intensity. Nevertheless, if the noise addition unit 172 is placed in the later stage of the DSP unit 173, there is a likelihood that it is not possible to reproduce an actual frequency distribution of the noise in the receiver and this leads to a degradation of code error rate estimation accuracy. In order to avoid this, the noise addition unit 172 adds, to the reception signal waveform at the time of direct detection, noise appropriately amplified such that the noise intensity after removal at the DSP unit 173 becomes the noise intensity calculated by the noise distribution calculation unit 1581*a*.

The DSP unit 173 performs DSP processing on the signal waveform after the propagation down-sampled with the noise added thereto. The DSP unit 173 outputs the signal waveform after the propagation on which the DSP processing has been performed to the threshold value determination unit 174.

The threshold value determination unit 174 decodes the reception code sequence by performing threshold value determination at the symbol position of the signal waveform after propagation on which the DSP processing has been performed. The threshold value determination unit 174 outputs the decoded reception code sequence to the code error rate calculation unit 159*a*.

Figure 9:
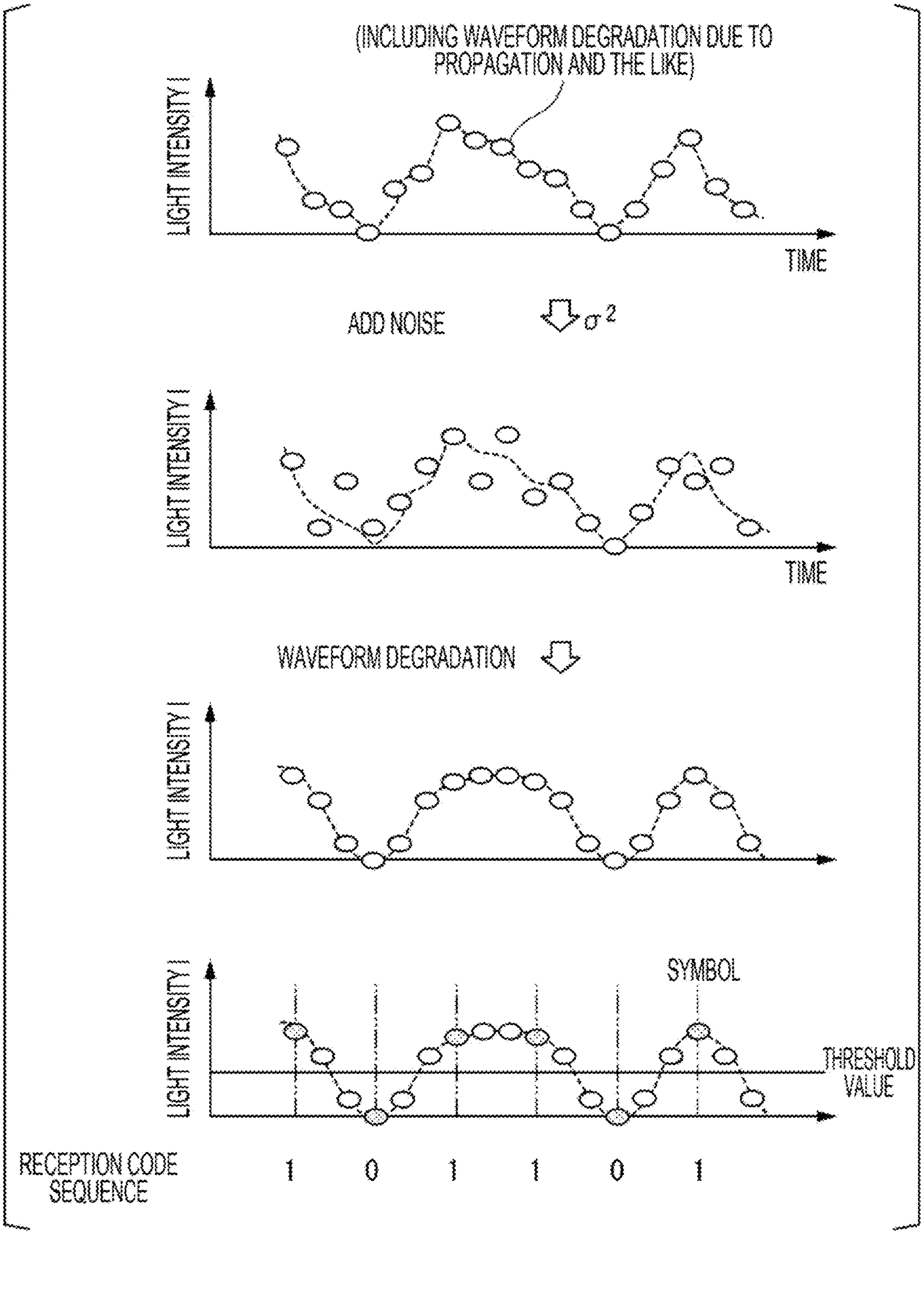
FIG. 9 A diagram illustrating a change in signal waveform after propagation due to processing in the second embodiment.

FIG. 9 is a diagram illustrating a change in signal waveform after propagation through processing in the second embodiment. FIG. 9 illustrates four diagrams. The first diagram from the top illustrates a signal waveform after propagation after the down-sampling unit 171 performs processing (down-sampling). The second diagram from the top illustrates a signal waveform after propagation after the noise addition unit 172 performs processing (noise addition). The third diagram from the top illustrates a signal waveform after propagation after the DSP unit 173 performs processing (waveform equalization through DSP processing). The fourth diagram from the top illustrates a result of performing threshold value determination by the threshold value determination unit 174. As illustrated in FIG. 9, a fact that 101101 has been obtained as a reception code sequence as a result of the threshold value determination by the threshold value determination unit 174 is illustrated. The code error rate calculation unit 159*a* compares the reception code sequence 101101 obtained by the threshold value determination unit 174 with the transmission code sequence and estimates a code error rate.

According to the code error rate estimation unit 15*a* in the second embodiment configured as described above, it is possible to simulate the influences of noise including the nonlinear optical effect by the noise addition unit 172 adding noise. Therefore, it is possible to estimate the code error rate with high accuracy and in a short period of time while taking both the nonlinear optical effect and the linear waveform change into consideration.

Although the case where the NRZ signal is used has been described as an example in the above example, it is possible to simulate influences of noise including the nonlinear optical effect by the noise addition unit 172 adding noise even in an arbitrary modulation scheme as long as the direct detection-type receiver is used. Furthermore, it is possible to estimate the code error rate even when an arbitrary modulation scheme is applied, by the DSP unit 173 performing decoding processing in accordance with the modulation scheme.

Modification Example of Second Embodiment

In the aforementioned embodiment, the configuration in which the code error rate calculation unit 159*a* compares the reception code sequence decoded as a result of the threshold value determination at the symbol position of the signal waveform after propagation on which the DSP processing has been performed with the transmission code sequence and estimates the code error rate has been described. The code error rate calculation unit 159*a* may be configured to estimate the code error rate similarly to the first embodiment on the basis of the probability density of the symbol of the signal waveform after propagation on which the DSP processing has been performed. In a case of such a configuration, the reception signal waveform calculation unit 158*a* includes a symbol position detection unit 169 and a symbol intensity calculation unit 170 instead of the threshold value determination unit 174. The symbol position detection unit 169 detects the symbol position in the signal waveform after propagation on which the DSP unit 173 has performed the DSP processing. The symbol intensity calculation unit 170 calculates the intensity $P_{symbol}$ of each symbol with noise added thereto on the basis of the signal waveform after propagation on which the DSP unit 173 has performed the DSP processing and the symbol position detected by the symbol position detection unit 169. Thereafter, the noise distribution calculation unit 1581*a* creates a histogram of each of the mark and the space from the intensity $P_{symbol}$ of each symbol with noise added thereto and regards the created histogram as the probability density of each of the mark and the space. The code error rate calculation unit 159*a* calculates the code error rate on the basis of threshold value determination for the probability densities of the mark and the space calculated by the reception signal waveform calculation unit 158*a* similarly to the first embodiment.

Third Embodiment

In the second embodiment, the configuration in which equalization of wavelength dispersion is performed through the DSP processing on the receiver side has been described. In a third embodiment, a configuration in which pre-equalization of wavelength dispersion is performed on a transmitter side will be described.

The configuration in which pre-equalization of wavelength dispersion is performed on the transmitter side in the third embodiment can be applied to any of the first embodiment and the second embodiment. Here, a configuration in a case where the configuration in which pre-equalization of wavelength dispersion is performed on the transmitter side in the third embodiment is applied to the first embodiment will be described. A case where the configuration in which pre-equalization of wavelength dispersion is performed on the transmitter side in the third embodiment is applied to the first embodiment is different from the first embodiment in that a propagation waveform calculation unit 157*b* instead of the propagation waveform calculation unit 157 is included in the code error rate estimation unit 15 as illustrated in FIG. 10.

Figure 10:
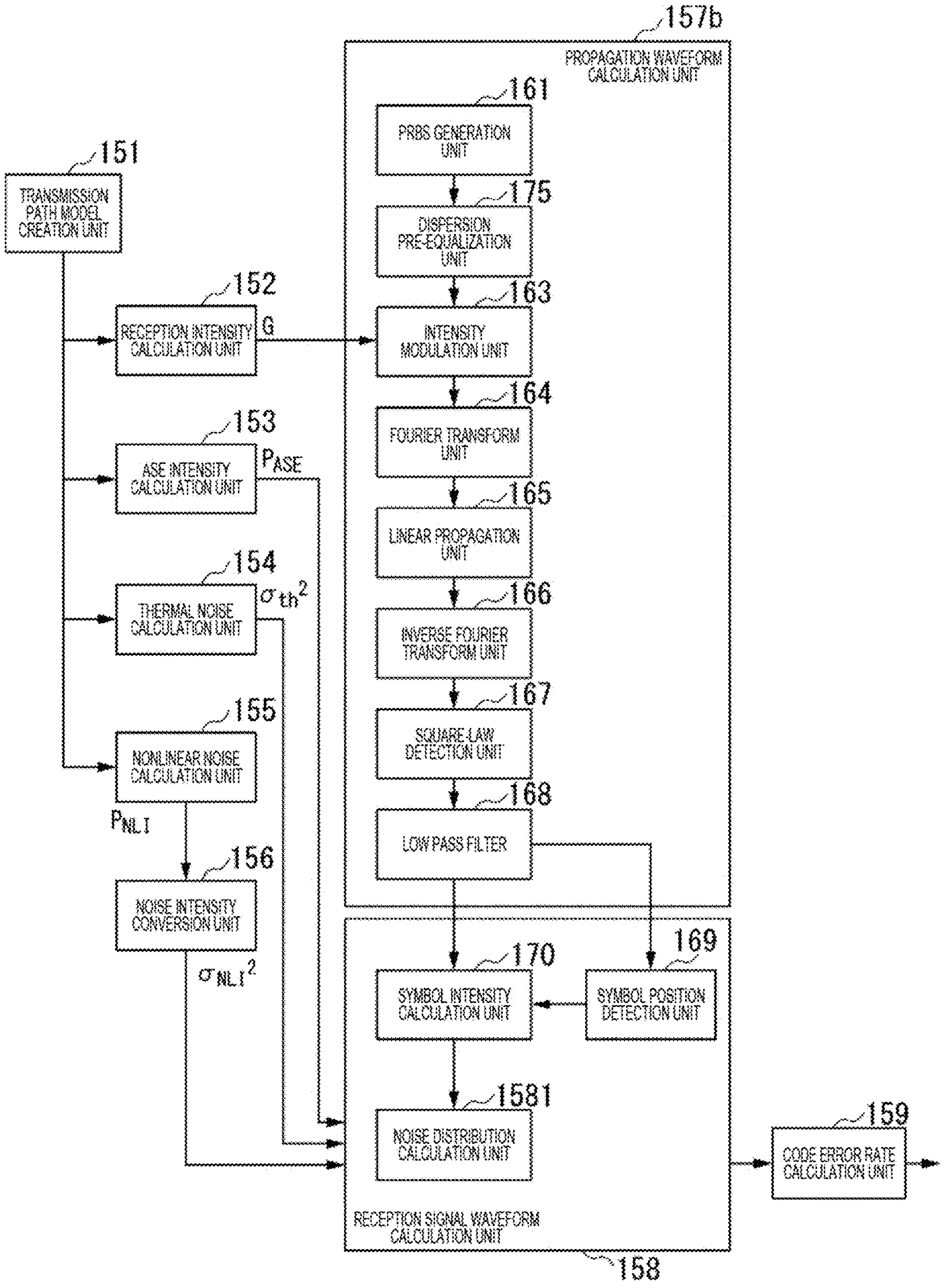
FIG. 10 A diagram illustrating configuration examples of a propagation waveform calculation unit and a reception signal waveform calculation unit in a third embodiment.
Figure 11:
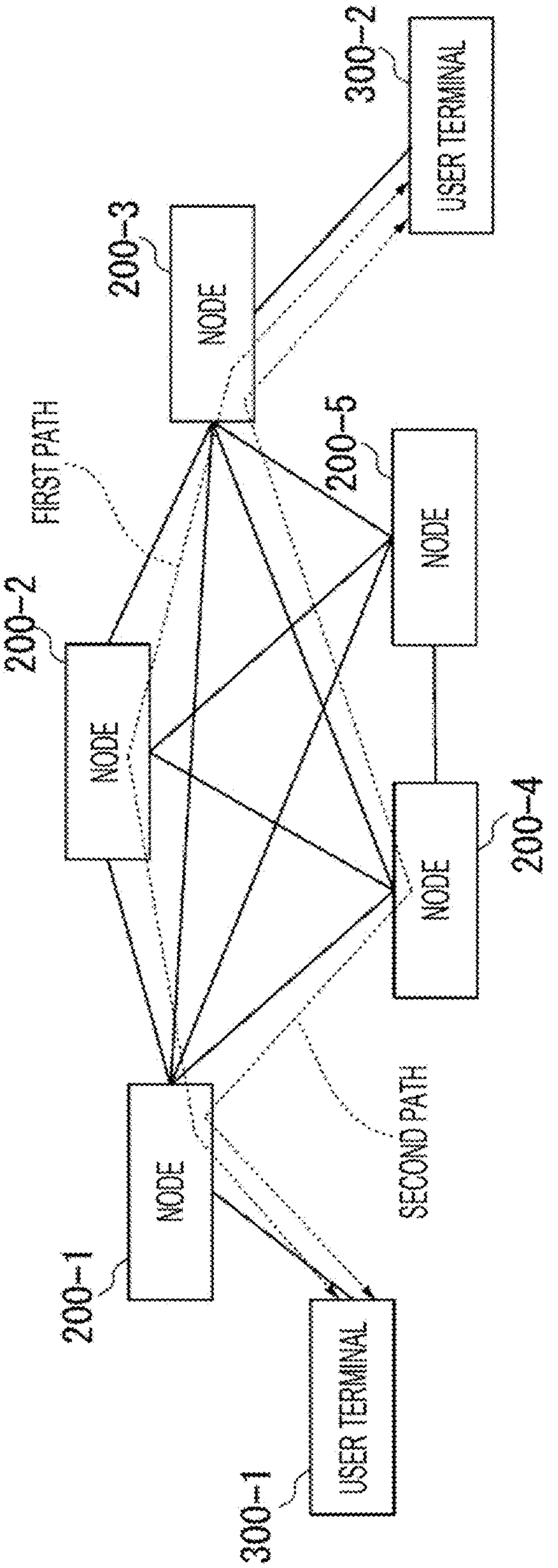
FIG. 11 A diagram illustrating a configuration example of an optical communication network in the related art.
Figure 12:
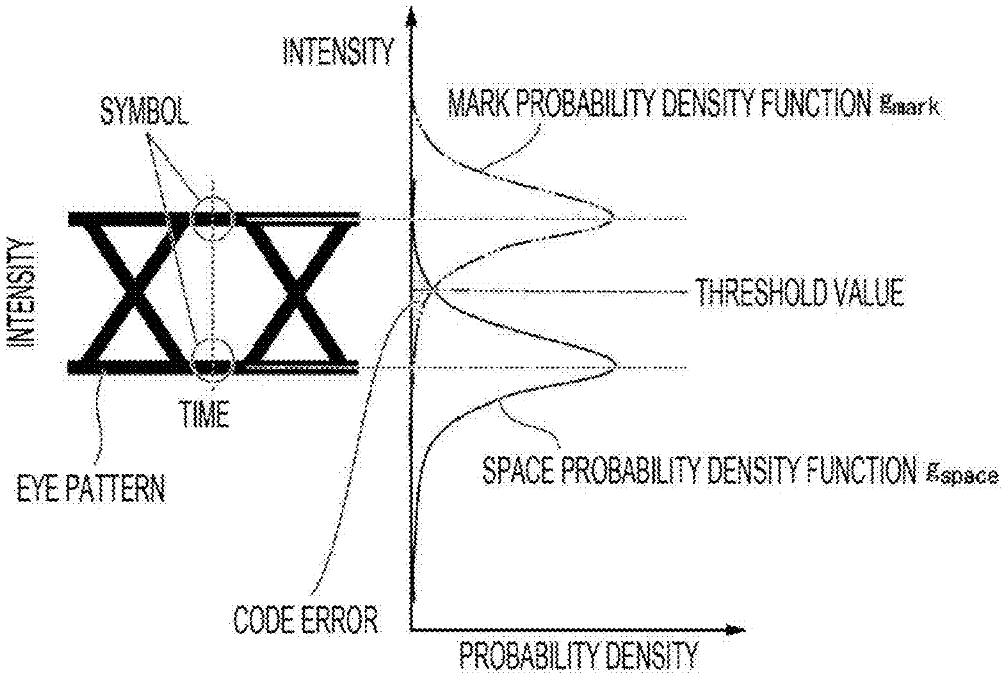
FIG. 12 A diagram illustrating a probability density function in a case where there is no waveform degradation in a reception signal.

FIG. 10 is a diagram illustrating configuration examples of the propagation waveform calculation unit 157*b* and a reception signal waveform calculation unit 158 in the third embodiment. Note that FIG. 10 also illustrates functional units other than the propagation waveform calculation unit 157*b* and the reception signal waveform calculation unit 158 in order to illustrate relationships with the other functional units. Hereinafter, configurations that are different from those in the first embodiment will be described. The propagation waveform calculation unit 157*b* includes a PRBS generation unit 161, an intensity modulation unit 163, a Fourier transform unit 164, a linear propagation unit 165, an inverse Fourier transform unit 166, a square-law detection unit 167, a low pass filter 168, and a dispersion pre-equalization unit 175.

In a case where a modulation signal is pre-equalized on the transmitter side by performing appropriate filtering to cancel out transmission path characteristics, the propagation waveform calculation unit 157*b* uses the dispersion pre-equalization unit 175 instead of the low pass filter 162 used in the first embodiment.

The dispersion pre-equalization unit 175 performs the pre-equalization on the transmitter side by performing appropriate filtering to cancel out the transmission path characteristics.

Next, a configuration in a case where the configuration in which pre-equalization of wavelength dispersion is performed on the transmitter side in the third embodiment is applied to the second embodiment will be described. In the case where the configuration in which pre-equalization of wavelength dispersion is performed on the transmitter side in the third embodiment is applied to the second embodiment, the propagation waveform calculation unit 157 illustrated in FIG. 7 may be replaced with the propagation waveform calculation unit 157*b* illustrated in FIG. 10.

According to the code error rate estimation unit 15 and the code error rate estimation unit 15*a* including the propagation waveform calculation unit 157*b* in the third embodiment configured as described above, pre-equalization of wavelength dispersion is performed on the transmitter side. Thereafter, processing similar to that in the first embodiment or the second embodiment is performed, and it is thus possible to estimate the code error rate with high accuracy and in a short period of time while taking both the nonlinear optical effect and the linear waveform change into consideration.

Although the case where the NRZ signal is used as a modulation scheme has been described as an example this time, it is possible to calculate linear waveform degradation by the propagation waveform calculation units 157*b* and 157*c* even in a case where the optical signal electric field E(t) is arbitrarily created at the intensity modulation unit 163.

First Modification Example of Third Embodiment

The configuration in which the intensity modulation unit 163 is used as a modulator has been described for the propagation waveform calculation unit 157*b* illustrated in FIG. 10. In a case where the intensity modulation unit 163 is used, an ability for equalizing waveform degradation due to wavelength dispersion is limited. On the other hand, an IQ modulator may be used as a modulator. It is possible to more strongly curb waveform degradation in a case where not only intensity but also a phase are modulated, by using the IQ modulator. Therefore, if this is simulated by the IQ modulator, it is possible to estimate the code error rate in this case.

First Modification Example Common to First Embodiment to Third Embodiment

The optical path control device 10 may be configured of one or more information processing devices. In a case where the optical path control device 10 is configured of a plurality of information processing devices, some functional units included in the optical path control device 10 are included in other devices. For example, the code error rate estimation units 15 and 15*a* may be mounted in another device which is thus configured as a code error rate estimation device, and the optical path control device 10 may be configured to include the communication unit 11, the connection terminal detection unit 12, the path database 13, the candidate path determination unit 14, and the optimal path determination unit 16. In a case of such a configuration, the optical path control device 10 transmits information regarding candidate paths to the code error rate estimation device and receives an estimation result from the code error rate estimation device. Then, the optimal path determination unit 16 of the optical path control device 10 determines an optimal path on the basis of the received estimation result.

Some or all of the functional units of the aforementioned optical path control device 10 are realized as software by a processor such as a central processing unit (CPU) executing a program stored in a storage device having a nonvolatile recording medium (non-transitory recording medium) and a storage unit. The program may be recorded in a computer-readable non-transitory recording medium. The computer-readable non-transitory recording medium is a non-transitory recording medium, for example, a portable medium such as a flexible disk, a magneto-optical disk, a read only memory (ROM), or a compact disc read only memory (CD-ROM), or a storage device such as a hard disk built in a computer system.

Some or all of the functional units of the aforementioned optical path control device 10 may be realized by using hardware including an electronic circuit or circuitry using a large scale integrated circuit (LSI), an application specific integrated circuit (ASIC), a programmable logic device (PLD), a field programmable gate array (FPGA), or the like.

Although the embodiments of the present invention have been described in detail with reference to the drawings, the specific configurations are not limited to the embodiments and include design and the like within a range not departing from the gist of the present invention.

INDUSTRIAL APPLICABILITY

The present invention can be applied to an optical transmission system using a direct detection receiver.

REFERENCE SIGNS LIST

10 Optical path control device
11 Communication unit
12 Connection terminal detection unit
13 Path database
14 Candidate path determination unit
15, 15*a* Code error rate estimation unit
16 Optimal path determination unit
20, 20-1 to 20-5 Node
30, 30-1, 30-2 User terminal
151 Transmission path model creation unit
152 Reception intensity calculation unit
153 ASE intensity calculation unit
154 Thermal noise calculation unit
155 Nonlinear noise calculation unit
156 Noise intensity conversion unit
157, 157*b* Propagation waveform calculation unit
158, 158*a* Reception signal waveform calculation unit
159, 159*a* Code error rate calculation unit
161 PRBS generation unit
162 Low pass filter
163 Intensity modulation unit
164 Fourier transform unit
165 Linear propagation unit
166 Inverse Fourier transform unit
167 Square-law detection unit
168 Low pass filter
169 Symbol position detection unit
170 Symbol intensity calculation unit
171 Down-sampling unit
172 Noise addition unit
173 DSP unit
174 Threshold value determination unit
175 Dispersion pre-equalization unit
1581, 1581*a* Noise distribution calculation unit

The invention claimed is:

1. A code error rate estimation device included in an optical transmission system using a direct detection receiver, the code error rate estimation device comprising:

a transmission path model creator configured to create a physical model of a transmission path for each candidate path for performing communication between user devices configured to perform communication;

a propagation waveform calculator configured to generate an electric field signal waveform to be output from a transmitter assumed in the physical model of the transmission path created by the transmission path model creator and generates a reception signal waveform at the time of direct detection by using linear fiber propagation simulation;

a nonlinear noise calculator configured to calculate nonlinear noise light intensity of light on the basis of the physical model of the transmission path created by the transmission path model creator;

a noise intensity convertor configured to convert the nonlinear noise light intensity of the light calculated by the nonlinear noise calculator into noise in an electrical stage;

a reception signal waveform calculator configured to calculate a Gaussian distribution of each symbol or each sample in a reception signal waveform at the time of the direct direction on the basis of the reception signal waveform at the time of the direct detection obtained by the propagation waveform calculator and the noise in the electrical stage converted by the noise intensity convertor; and a code error rate calculator configured to calculate a code error rate on the basis of the Gaussian distribution of each symbol or each sample calculated by the reception signal waveform calculator.

2. The code error rate estimation device according to claim 1, wherein the reception signal waveform calculator splits each symbol in the reception signal waveform at the time of the direct detection into a mark and a space, calculates a Gaussian distribution of each symbol with intensity of each symbol included at a center, adds up the calculated Gaussian distribution of each symbol, and thereby calculates a probability density of each of the mark and the space, and the code error rate calculator calculates the code error rate by performing threshold value determination for the probability densities of the mark and the space.

3. The code error rate estimation device according to claim 1, wherein the reception signal waveform calculator includes a noise distribution calculator configured to calculate intensity of each sample after the reception signal waveform at the time of the direct detection is down-sampled and calculates a Gaussian distribution for each sample on the basis of the intensity calculated for each sample, a noise adder configured to add random noise in accordance with the Gaussian distribution of each sample calculated by the noise distribution calculator to the reception signal waveform at the time of the direct detection, and a digital signal processor configured to perform digital signal processing on the reception signal waveform at the time of the direct detection with the random noise added thereto.

4. The code error rate estimation device according to claim 3, wherein the reception signal waveform calculator further includes a threshold value determiner configured to decode a reception code sequence through threshold value determination for the reception signal waveform at the time of the direct detection after the digital signal processing performed by the digital signal processor-processing unit, and the code error rate calculator calculates the code error rate by comparing a transmission code sequence with the reception code sequence decoded by the threshold value determiner.

5. The code error rate estimation device according to claim 3, wherein the reception signal waveform calculator splits each symbol in the reception signal waveform at the time of the direct detection after the digital signal processing performed by the digital signal processor into a mark and a space and calculates a probability density of each of the mark and the space from a histogram of intensity of each symbol with noise added thereto, and the code error rate calculator calculates the code error rate by performing threshold value determination for the probability densities of the mark and the space.

6. The code error rate estimation device according to claim 1, wherein the noise adder adds, to the reception signal waveform at the time of the direct detection, noise that has been amplified such that noise intensity after removal by the digital signal processor is the intensity calculated by the noise distribution calculator.

7. The code error rate estimation device according to claim 1, wherein the propagation waveform calculator generates a pseudorandom signal and performs pre-equalization on a transmission side by performing filtering of canceling out a transmission path characteristic on the generated pseudorandom signal.

8. A code error rate estimation method performed by a code error rate estimation device included in an optical transmission system using a direct detection receiver, the code error rate estimation method comprising:

creating a physical model of a transmission path for each candidate path for performing communication between user devices configured to perform communication;

generating an electric field signal waveform to be output from a transmitter assumed in the created physical model of the transmission path and generating a reception signal waveform at the time of direct detection by using linear fiber propagation simulation;

calculating nonlinear noise light intensity of light on the basis of the created physical model of the transmission path;

converting the calculated nonlinear noise light intensity of the light into noise in an electrical stage;

calculating a Gaussian distribution of each symbol or each sample in a reception signal waveform at the time of the direct direction on the basis of the obtained reception signal waveform at the time of the direct detection and the converted noise in the electrical stage; and calculating a code error rate on the basis of the Gaussian distribution of each symbol or each sample.

* * * * *